(12) United States Patent
Ota et al.

(10) Patent No.: US 7,073,639 B2
(45) Date of Patent: Jul. 11, 2006

(54) ROTATIONAL MACHINE

(75) Inventors: Hitoshi Ota, Tokyo (JP); Akira Hashimoto, Tokyo (JP); Shinichiro Yoshida, Tokyo (JP); Yuji Nakahara, Tokyo (JP); Hisanori Uozumi, Tokyo (JP); Naoki Hashiguchi, Tokyo (JP); Naoki Kajita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/893,348

(22) Filed: Jul. 19, 2004

(65) Prior Publication Data

US 2005/0045436 A1 Mar. 3, 2005

(30) Foreign Application Priority Data

Aug. 25, 2003 (JP) ............................. 2003-299447

(51) Int. Cl.
*B60L 7/00* (2006.01)
(52) U.S. Cl. ....................... 188/161; 277/549; 187/254
(58) Field of Classification Search ............... 188/161; 277/549, 551; 187/254
See application file for complete search history.

(56) References Cited

U.S. PATENT DOCUMENTS

| 4,327,924 A | * | 5/1982 | Wheeler ..................... 277/551 |
| 4,688,660 A | * | 8/1987 | Kaneko ..................... 254/343 |
| 5,931,274 A | * | 8/1999 | Sakurai et al. .......... 192/84.961 |
| 2005/0076739 A1 | * | 4/2005 | Uduka et al. .................. 74/572 |

FOREIGN PATENT DOCUMENTS

| JP | 4350085 | * 12/1992 |
| JP | 8-245107 | 9/1996 |
| JP | 2001-139265 | 5/2001 |
| JP | 2002-302356 | 10/2002 |

* cited by examiner

*Primary Examiner*—Devon Kramer
(74) *Attorney, Agent, or Firm*—Buchanan Ingersoll PC

(57) ABSTRACT

A rotational machine includes a shaft, a rotary member rotatably mounted on the shaft with a bearing fitted between the shaft and the rotary member, an oil seal for sealing the bearing to prevent leakage of lubricant from inside the bearing through its axial end onto a surface of the rotary member, a brake which comes into sliding contact with a contact surface area formed on the surface of the rotary member for arresting rotation of the rotary member, a supporting member fixedly mounted on the shaft face to face with the rotary member forming a gap therebetween, the gap serving as a fluid path through which the lubricant which has leaked over the oil seal is allowed to flow, and an oil stop portion formed at a location in the gap between the oil seal and the contact surface area for impeding flow of the leaked lubricant.

19 Claims, 19 Drawing Sheets

ROTATIONAL MACHINE

BACKGROUND OF THE INVENTION

1. Field of the Invention

The present invention relates to a rotational machine provided with a brake, such as a traction machine of an elevator.

2. Description of the Background Art

A known example of a rotational machine having a brake is a traction machine used in an elevator. Lubricant is used at bearings of a traction machine of this kind. If the lubricant leaks into a gap between the brake and a rotating portion of the machine with which the brake comes into contact, a braking force produced by the brake is considerably reduced. Conventionally, there are provided oil seals near the bearings. Taking into account the fact that the oil seals deteriorate as a result of long-term use, however, the oil seals employ a structure which more or less allows leakage of the lubricant in principle.

To overcome this leakage problem, Japanese Laid-open Patent Publication No. 2002-302356 discloses an arrangement in which an elevator is furnished with an oil leakage sensor located in a gearbox for detecting leakage of lubricant from a bearing portion of a traction machine. When the oil leakage sensor detects leakage of the lubricant, an equipment maintenance company is informed of this situation so that the company's servicing personnel can provide prompt servicing. According to the Publication, the oil leakage sensor includes a float switch held in a receptacle for detecting a liquid level. The float switch is activated when the leakage of the lubricant deposited in the receptacle reaches a specified amount.

According to the arrangement of the aforementioned Publication, it would be possible to inform the equipment maintenance company of the need for servicing so that the company's servicing personnel can promptly service the elevator when the oil leakage sensor has detected lubricant leakage caused by deterioration of an oil seal. It is however necessary to keep the elevator shut down while servicing work is being carried out, making it impossible to use the elevator for some time.

Another problem of this conventional arrangement is that, if the lubricant leaks in large quantities, it would instantly flow out and spread over a rotating portion of a traction mechanism with which a brake comes into contact, resulting in a reduction in braking force, for instance, although it might be possible to detect lubricant leakage with the oil leakage sensor.

SUMMARY OF THE INVENTION

It has conventionally been desired to solve the aforementioned problems of the prior art. Accordingly, it is an object of the invention to provide a rotational machine capable of maintaining a braking force of a brake by preventing lubricant from spreading onto a rotating portion with which the brake comes into contact even when the lubricant has leaked over an oil seal which has deteriorated over time.

According to the invention, a rotational machine includes a shaft having a central axis, a rotary member mounted on the shaft in such a manner that the rotary member can rotate about the central axis of the shaft with a bearing fitted between the shaft and the rotary member, an oil seal for sealing the bearing to prevent leakage of lubricant from inside the bearing through an axial end thereof onto a surface of the rotary member, a brake which comes into sliding contact with a contact surface area formed on part of the surface of the rotary member for arresting rotation of the rotary member, a supporting member fixedly mounted on the shaft face to face with the rotary member, forming a gap between the rotary member and the supporting member, the gap serving as a fluid path through which the lubricant which has leaked over the oil seal is allowed to flow, and an oil stopper formed at a location in the gap between the oil seal and the contact surface area for impeding flow of the leaked lubricant.

In the rotational machine thus constructed, the oil stopper keeps the leaked lubricant from flowing onto the contact surface area of the rotary member so that the brake maintains its normal braking force even when the lubricant has leaked over the oil seal due to its deterioration, for example.

The rotational machine of the invention is suited for use as a traction machine of an elevator and other traction equipment having a brake.

These and other objects, features and advantages of the invention will become more apparent upon reading the following detailed description along with the accompanying drawings.

DESCRIPTION OF THE PREFERRED EMBODIMENTS

First Embodiment

Figure 1:
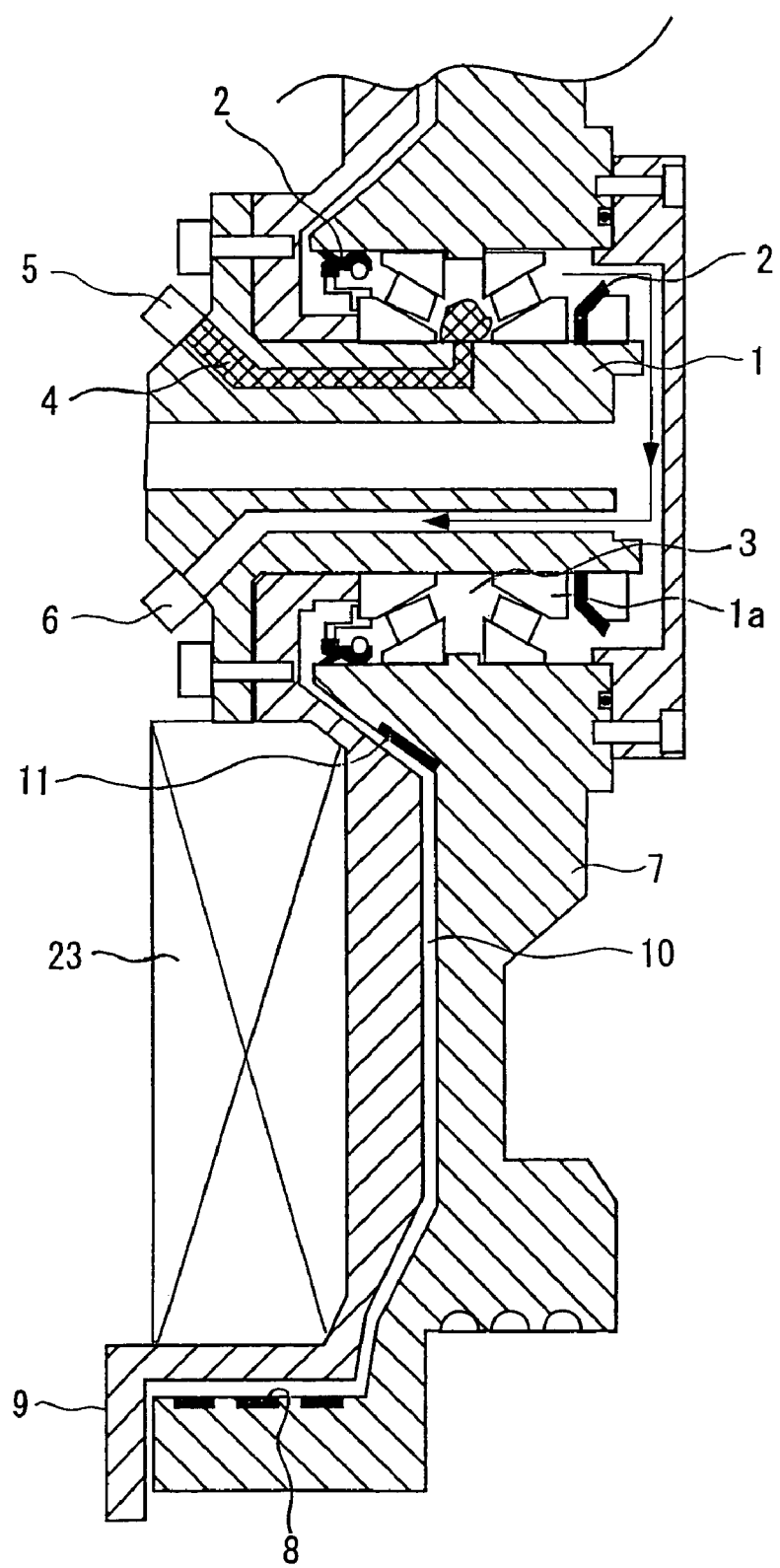
FIG. 1 is a fragmentary sectional diagram showing a rotational machine according to a first embodiment of the invention.
Figure 2:
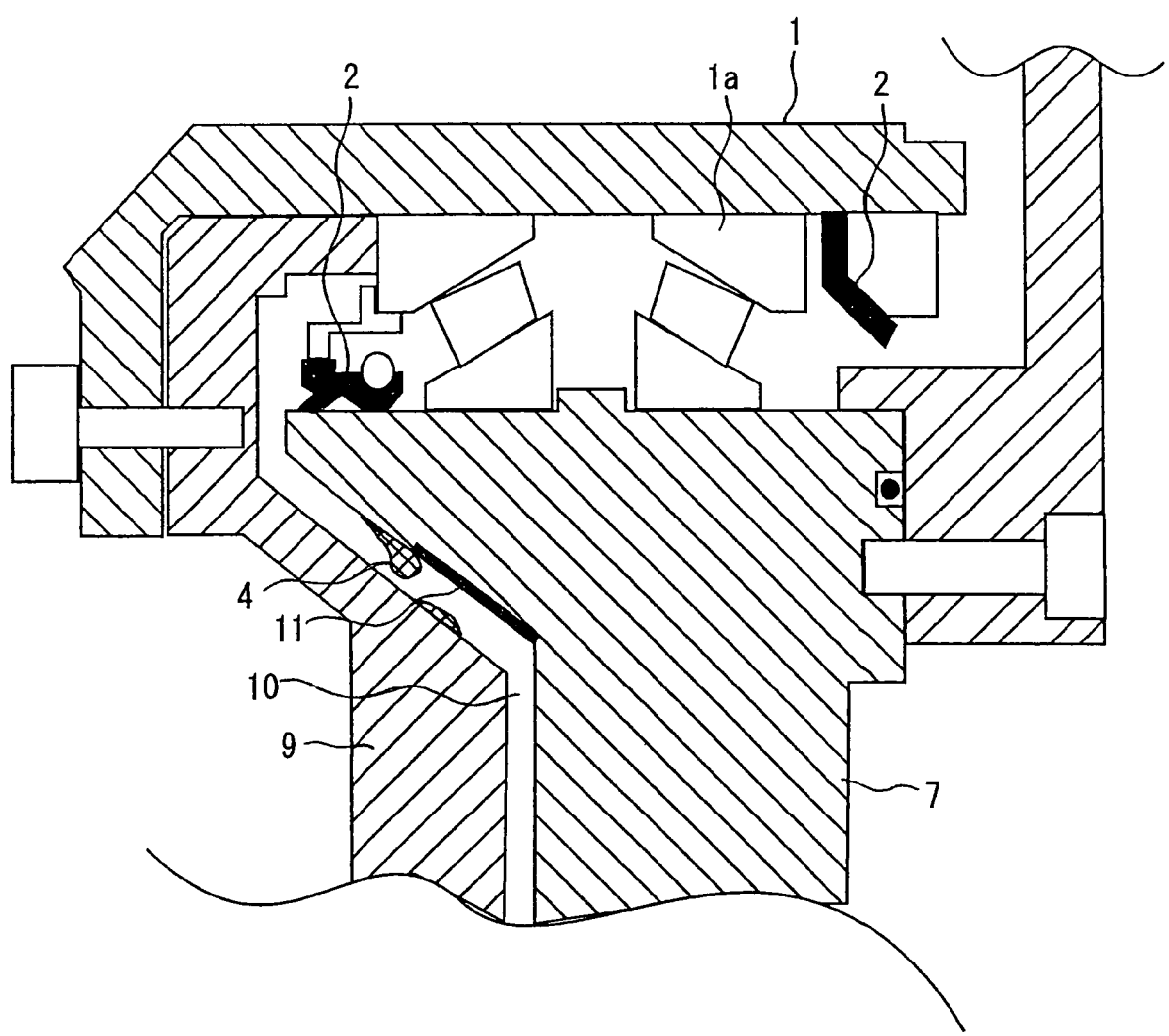
FIG. 2 is an enlarged fragmentary sectional diagram showing the rotational machine of FIG. 1.

FIGS. 1 and 2 are fragmentary sectional diagrams showing a rotational machine according to a first embodiment of the invention. Referring to these Figures, there are fitted oil seals 2 at axial ends of a bearing 1a which is mounted on an axial end portion of a shaft 1, and lubricant 4 is filled in a hollow space 3 formed in the bearing 1a. The lubricant 4, such as grease, is filled into the internal space 3 of the bearing 1a through a lubricant feeding hole 5 formed in the shaft 1. In industrial rotational machines, deteriorated lubricant are replaced with new lubricant at regular intervals. In the rotational machine of this embodiment, new grease is filled through the lubricant feeding hole 5 and used grease is discharged through a passage in a direction shown by arrows. As shown in FIG. 1, there is formed a discharge hole 6 in the shaft 1 for expelling the used grease. With the provision of the discharge hole 6, it is possible to replace the lubricant 4 without the need to disassemble a bearing assembly including the bearing 1a. The used and new greases can be easily distinguished from each other, as the used grease is discolored. When replacing the lubricant 4, the new non-discolored grease should be charged through the lubricant feeding hole 5 until it is forced out through the discharge hole 6.

A rotary member 7, such as a grooved cable pulley, or sheave, of an elevator, that can turn around the shaft 1 is fitted on the end portion of the shaft 1 with the bearing 1a placed between the shaft 1 and the rotary member 7.

A supporting member 9 is fixedly mounted on the shaft 1 in such a manner that a gap 10 is created between the rotary member 7 and the supporting member 9. This gap 10 works as a fluid path through which the lubricant 4 which has leaked over one of the oil seals 2 (the left-hand oil seal 2 as illustrated in FIG. 1) flows. There is formed an oil stop portion 11 on one surface of the rotary member 7 facing the gap 10. Located in the fluid path (gap 10) which leads to a contact surface area 8 of the rotary member 7 with which a brake shoe (not shown) of a brake 23 comes into contact, the oil stop portion 11 is an oil-repellent surface area treated to inhibit the flow of the lubricant 4 which has leaked over the left-hand oil seal 2.

There is formed a cutout (not shown) in a portion of the supporting member 9 facing the contact surface area 8 of the rotary member 7. When the brake 23 is activated, its brake shoe protrudes through this cutout in the supporting member 9 and presses against the contact surface area 8 of the rotary member 7.

When the oil seals 2 have worn out or otherwise deteriorated as a result of use over an extended period of time, the lubricant (grease) 4 or low-viscosity base oil component of the grease which has separated from the grease due to deterioration would leak over the left-hand oil seal 2. The leaking lubricant (grease) 4 or base oil may flow along the surface of the rotary member 7 facing the gap 10 and onto the contact surface area 8, causing a substantial reduction in a braking force produced by the brake 23.

In this embodiment, when the lubricant (grease) 4 or the base oil which has leaked over the left-hand oil seal 2 reaches the oil stop portion 11 in the gap 10, the lubricant (grease) 4 or the base oil is blocked by the oil stop portion 11 and forms generally spherical masses at the oil stop portion 11 due to surface tension. As these spherical masses of the lubricant (grease) 4 or the base oil collect at the oil stop portion 11, they fall in the form of droplets due to their own weight or a centrifugal force produced by the rotary member 7 and flow along a surface of the supporting member 9 facing the rotary member 7. Since the lubricant (grease) 4 or the base oil which has leaked over the left-hand oil seal 2 flows along the surface of the supporting member 9 in this fashion without spreading over the contact surface area 8 of the rotary member 7, the brake 23 maintains its normal braking force.

The oil stop portion 11 of the rotary member 7 is coated or treated by a baking process with an oil-repellent substance which gives oil-repelling properties. The oil-repellent substance may be selected from the group consisting of polytetrafluoroethylene (PTFE), tetrafluoroethylene perfluoroalkylvinylether copolymer (or perfluoroalkyoxy: PFA), tetrafluoroethylene hexafluoropropylene copolymer (or fluorinated ethylene-propylene: FEP), and $CF_3$ polymers.

The oil seals 2 may be lip seals or mechanical seals. Alternatively, the bearing 1a may be of a type incorporating seals.

Figure 3:
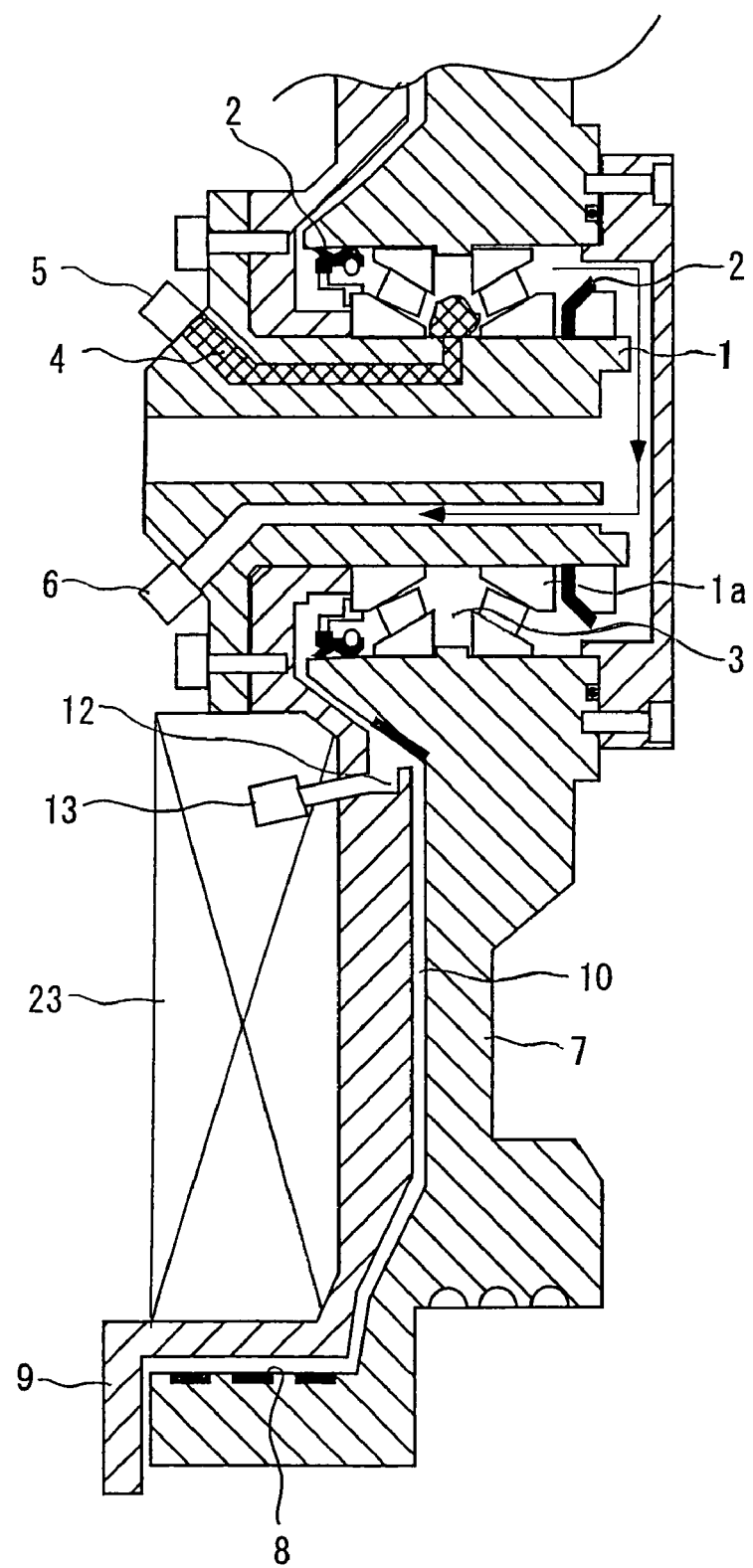
FIG. 3 is a fragmentary sectional diagram showing a variation of the rotational machine of the first embodiment employing a modified form of an oil stop portion.
Figure 4:
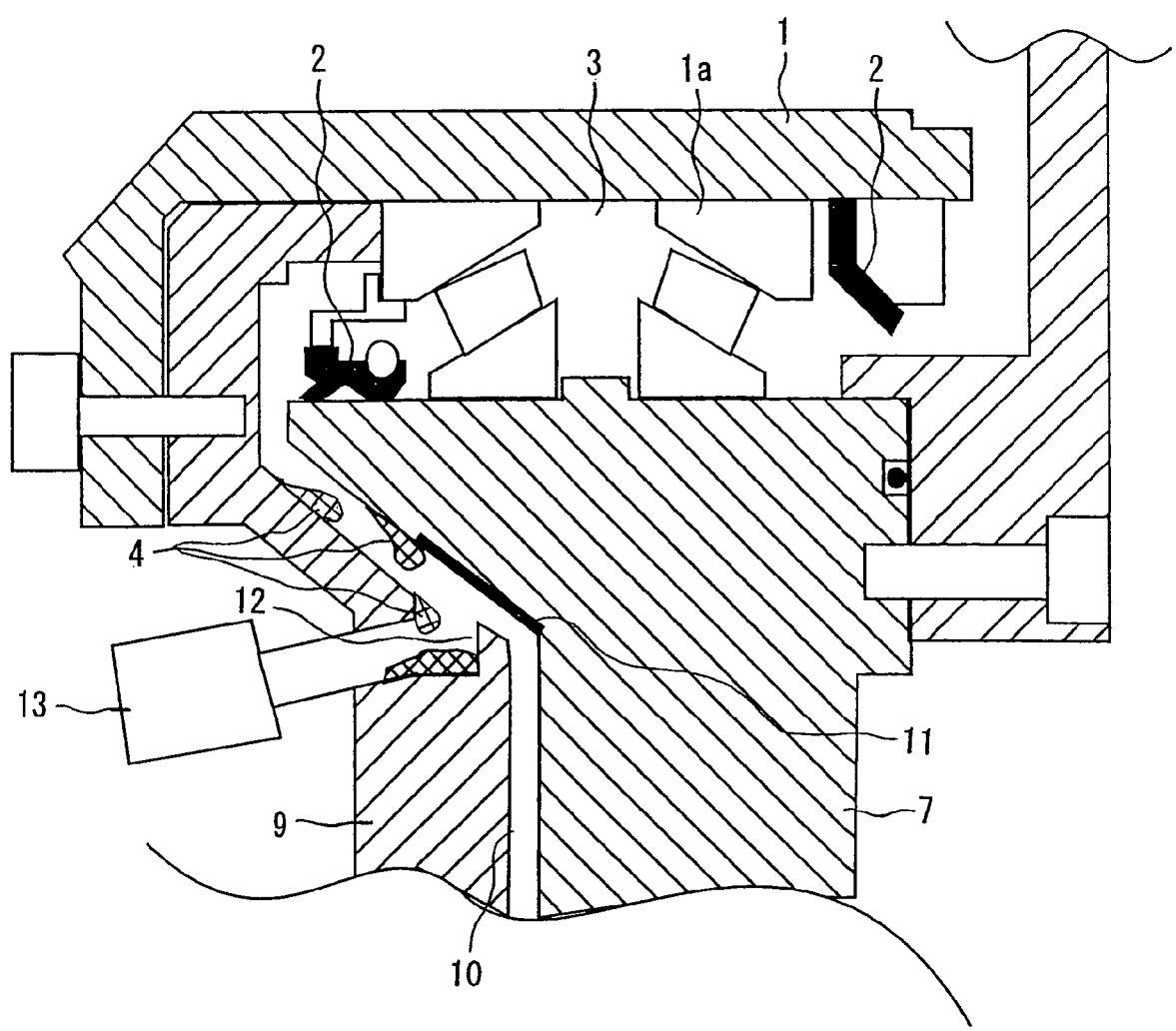
FIG. 4 is an enlarged fragmentary sectional diagram of the rotational machine of FIG. 3.

FIGS. 3 and 4 are fragmentary sectional diagrams showing a variation of the rotational machine of the first embodiment employing a modified form of an oil stop portion that is intended to cope with a problem which will arise when the lubricant 4 which has leaked over the left-hand oil seal 2 splashes and flows along the surface of the supporting member 9.

In this variation of the first embodiment, there are formed a groove 12 and a lubricant outlet 13 in the supporting member 9 facing the gap 10 as shown in FIG. 3. As illustrated in FIG. 4, the lubricant 4 which has leaked over the left-hand oil seal 2 is blocked by the oil stop portion 11, splashed in scattered masses and discharged to the exterior through the groove 12 and the lubricant outlet 13.

Figure 5:
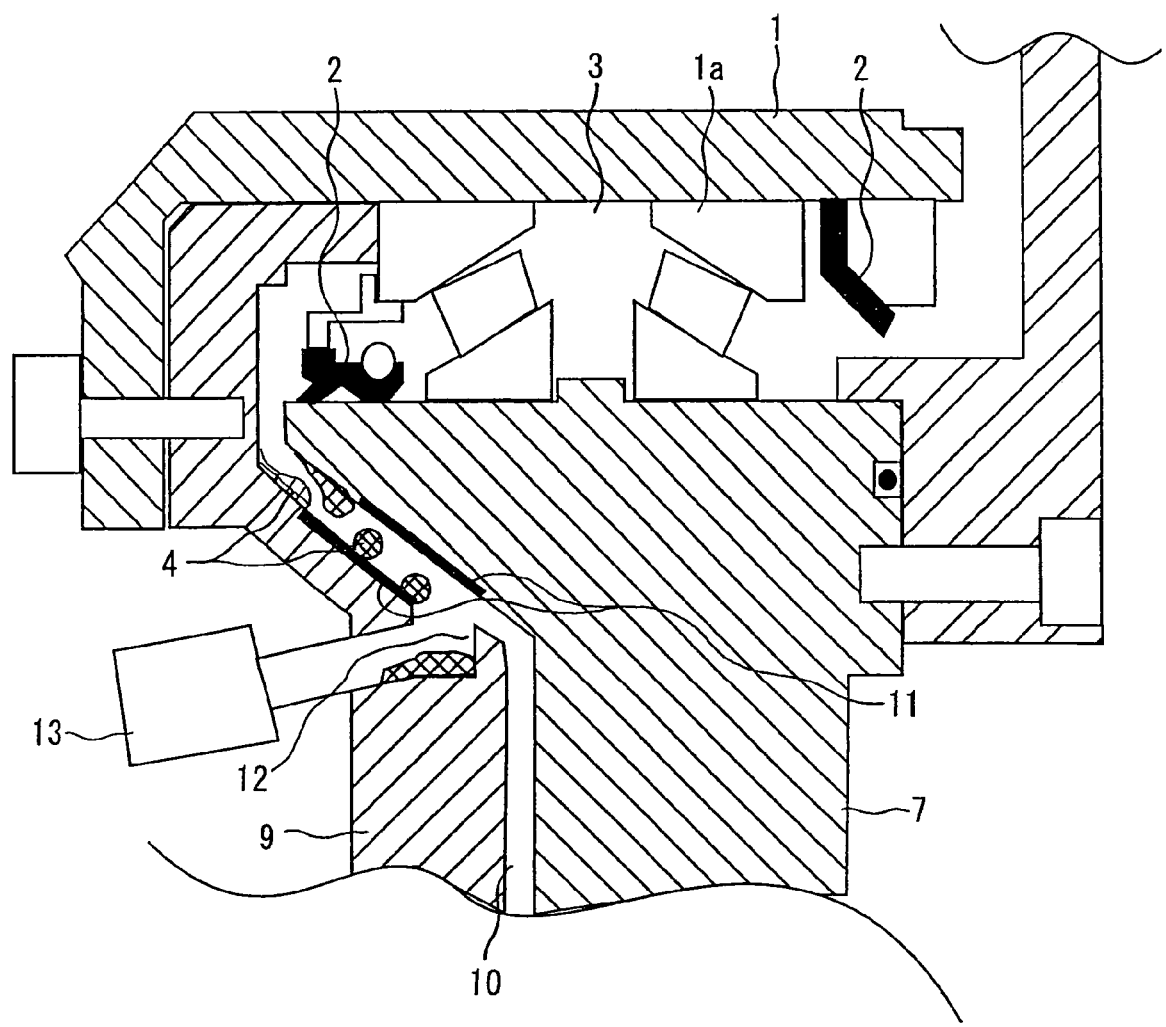
FIG. 5 is an enlarged fragmentary sectional diagram showing another variation of the rotational machine of the first embodiment employing an additional oil stop portion formed on a supporting member.

FIG. 5 is an enlarged fragmentary sectional diagram showing another variation of the rotational machine of the first embodiment, in which an additional oil stop portion (oil-repellent surface area) 11 is formed on the supporting member 9, besides the aforementioned groove 12 and lubricant outlet 13 formed in the supporting member 9. This variation of the first embodiment is also intended to cope with a problem which may arise when the lubricant 4 which has leaked over the left-hand oil seal 2 splashes and flows along the surface of the supporting member 9.

When the lubricant 4 which has leaked over the left-hand oil seal 2 flows along the surface of the supporting member 9, as well as the surface of the rotary member 7, and reaches the oil stop portions 11 as illustrated in FIG. 5, the lubricant 4 is blocked by the oil stop portions 11 until masses of the lubricant 4 grow into spheres of a particular size at boundaries between the surface of the rotary member 7 itself and the oil stop portion 11, and between the surface of the supporting member 9 itself and the oil stop portion 11. Then, the spherical masses of the lubricant 4 fall and tumble along the surface of the supporting member 9. These masses of the lubricant 4 flow into the groove 12 and are eventually discharged through the lubricant outlet 13. Since the leaked lubricant 4 is quickly discharged to the exterior due to the provision of the aforementioned additional oil stop portion 11 on the supporting member 9, it is possible to prevent formation of vaporized masses of the lubricant 4 inside the gap 10.

While the oil stop portions 11 are formed on the surfaces of both the rotary member 7 and the supporting member 9 in the aforementioned variation of the first embodiment shown in FIG. 5, the oil stop portion 11 on the surface of the rotary member 7 is not needed if the lubricant 4 which has leaked over the left-hand oil seal 2 is entirely splashed onto the supporting member 9 and flows only along the surface of the supporting member 9.

Second Embodiment

Figure 6:
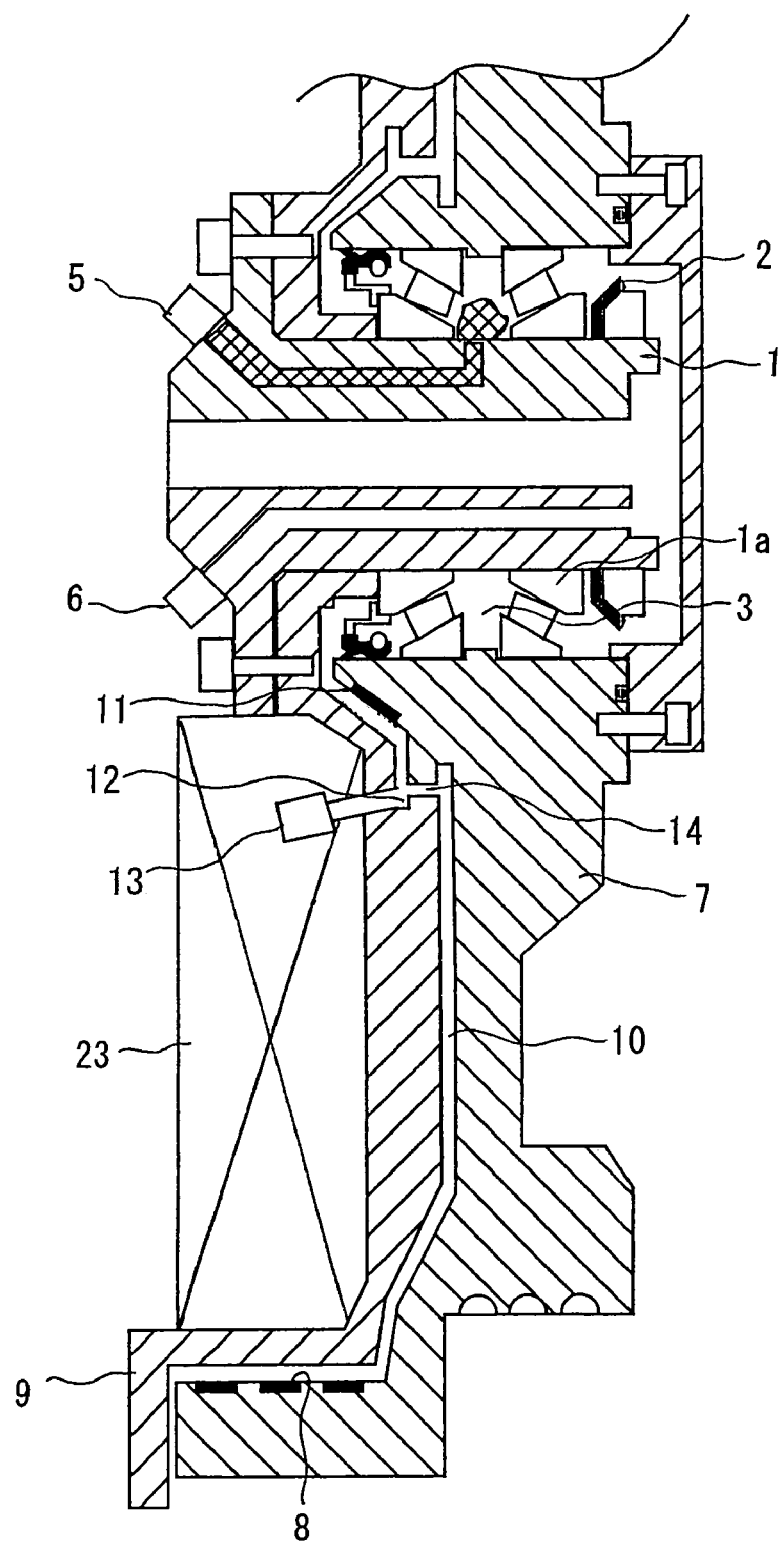
FIG. 6 is a fragmentary sectional diagram showing a rotational machine according to a second embodiment of the invention.
Figure 7:
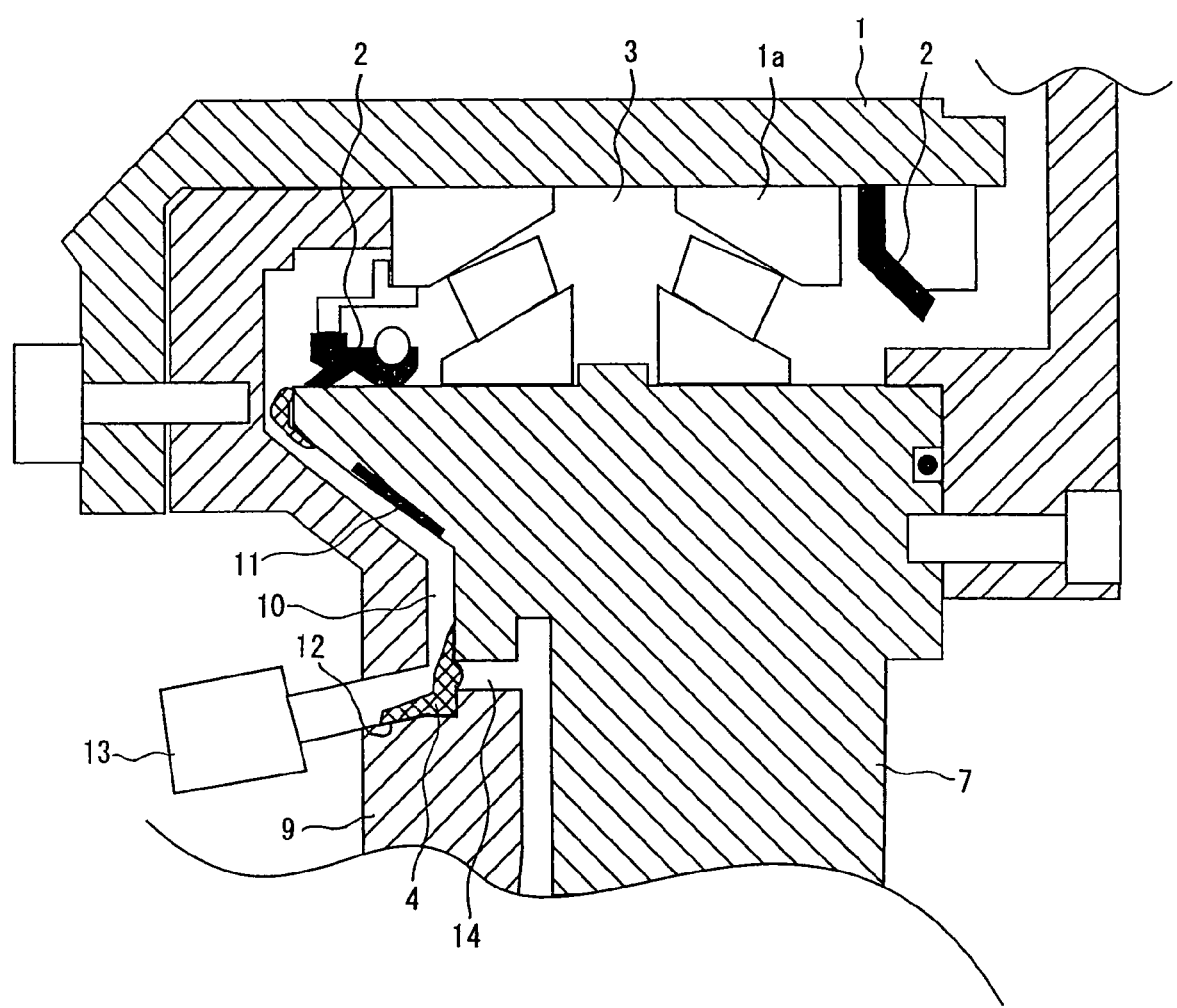
FIG. 7 is an enlarged fragmentary sectional diagram showing the rotational machine of FIG. 6.
Figure 8:
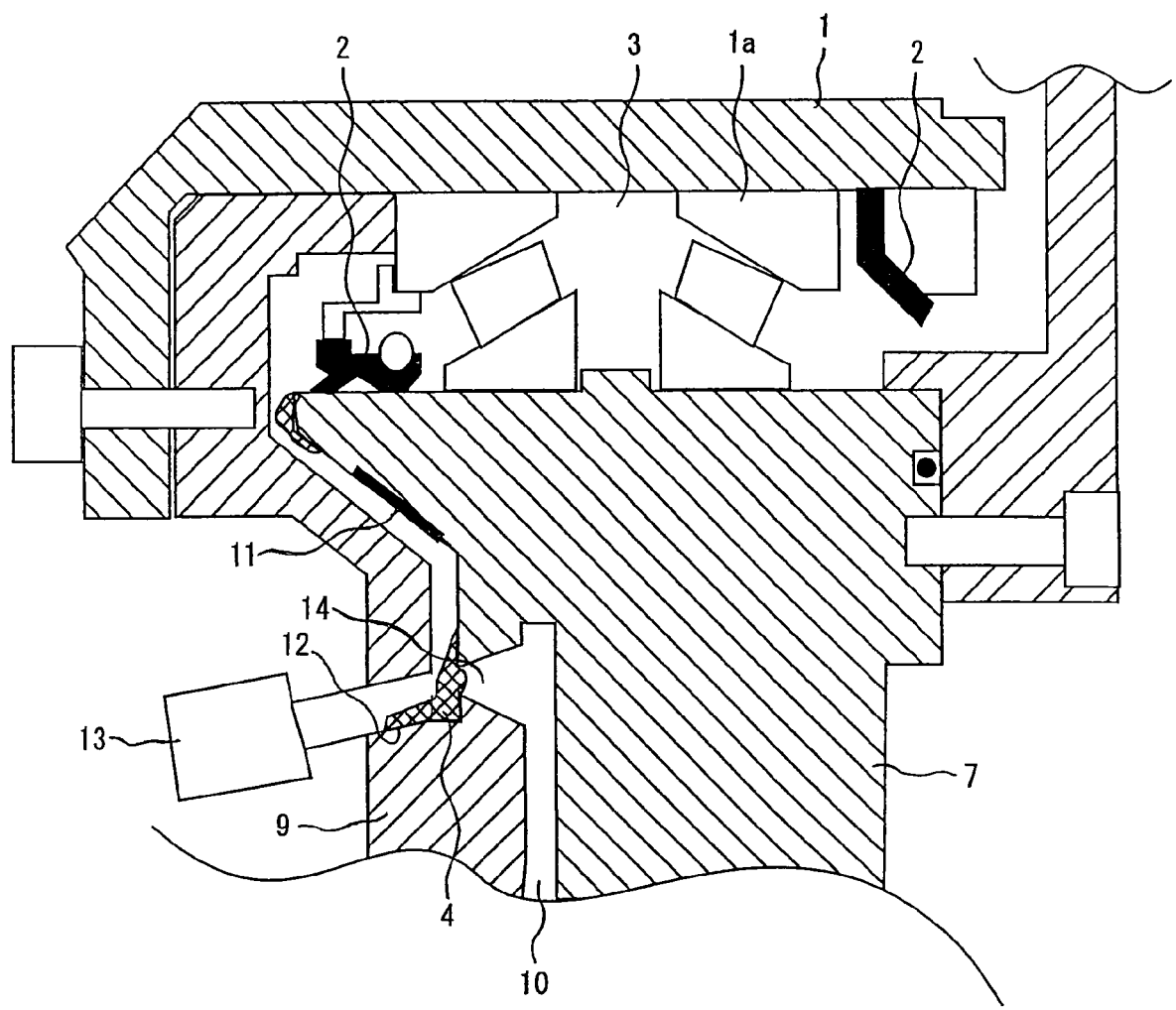
FIG. 8 is an enlarged fragmentary sectional diagram showing a variation of the rotational machine of FIG. 6.

FIGS. 6, 7 and 8 are fragmentary sectional diagrams showing a rotational machine according to a second embodiment of the invention, in which elements identical or similar to those of the first embodiment are designated by the same reference numerals.

Referring to FIG. 6, there is formed a constricted part 14 in the gap 10. Serving as an oil stop portion, the constricted part 14 is made narrower than the other part of the gap 10. There are also formed a groove 12 and a lubricant outlet 13 connecting to the constricted part 14 as illustrated.

The lubricant 4 which has leaked over the left-hand oil seal 2 is trapped at the constricted part 14 of the gap 10 due to the effect of surface tension as shown in FIG. 7 and is discharged to the exterior through the groove 12 and the lubricant outlet 13. Therefore, the leaked lubricant 4 does not flow down to the contact surface area 8 so that the brake 23 remains dry and maintains its normal braking force.

While the constricted part 14 has a fixed clearance along its length in the second embodiment shown in FIGS. 6 and 7, the constricted part 14 may be tapered so that the clearance varies in its longitudinal direction as shown in FIG. 8. This variation of the second embodiment produces the same advantageous effect as the second embodiment.

Third Embodiment

In a case where the lubricant 4 leaking over the left-hand oil seal 2 has a low viscosity or the lubricant 4 is expected to leak in large quantities and accumulate in the groove 12, it is necessary to reduce the clearance of the constricted part 14.

FIGS. 9A, 9B, 10A and 10B are enlarged fragmentary sectional diagrams showing a rotational machine according to a third embodiment of the invention, in which elements identical or similar to those of the foregoing embodiments are designated by the same reference numerals.

Figure 9A:
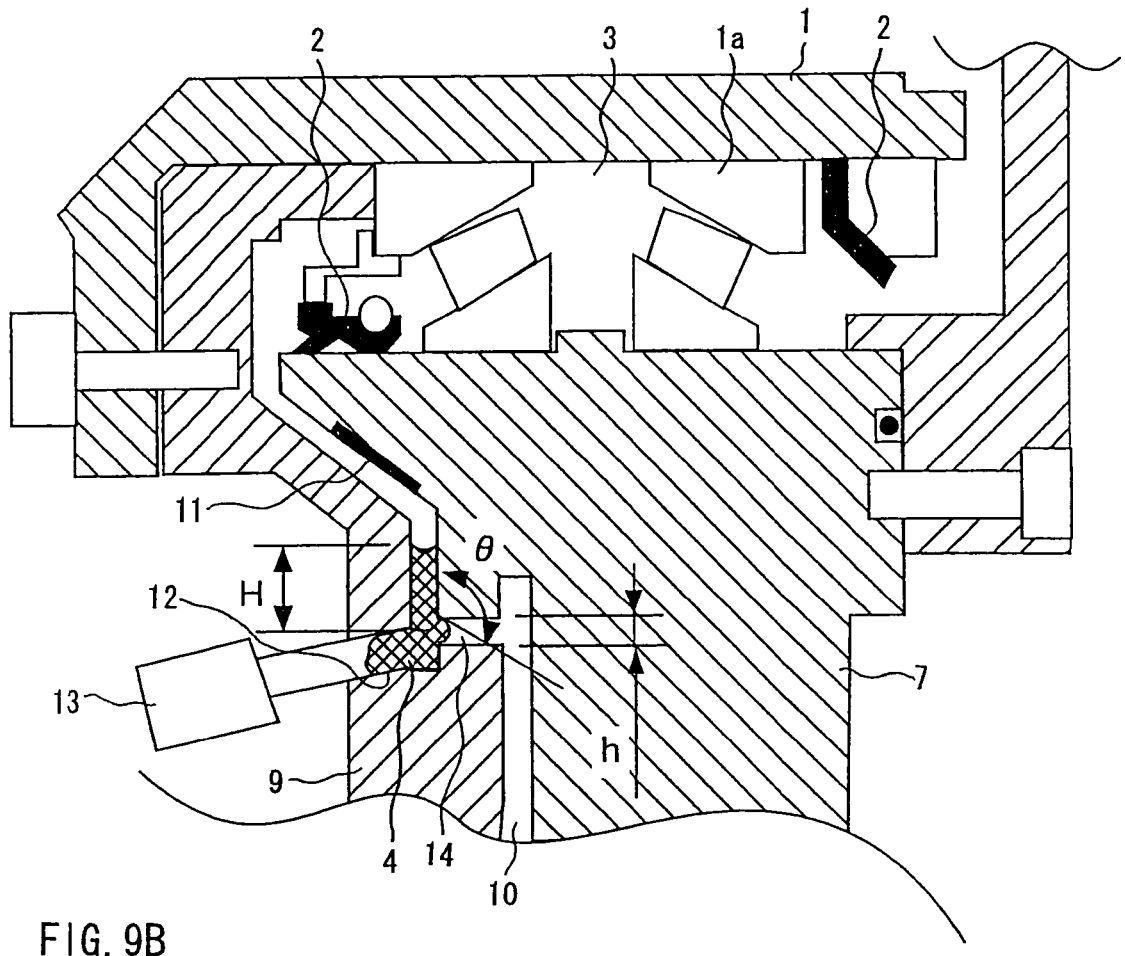
FIGS. 9A and 9B are enlarged fragmentary sectional diagrams showing a rotational machine according to a third embodiment of the invention and a variation thereof, respectively.

Referring to FIG. 9A, the symbol H represents the vertical dimension (height) of a deposit of the lubricant 4 that has accumulated just above a central axis of the constricted part 14 up to the top of the deposit, the symbol h represents the clearance of the constricted part 14, the symbol $\gamma$ represents the amount of surface tension of the lubricant 4, the symbol $\rho$ represents the density of the lubricant 4, and the symbol $\theta$ represents the contact angle between a round outer surface of the lubricant 4 and a circumferential surface of the constricted part 14 formed in the rotary member 7. In the illustrated example of the embodiment, this contact angle $\theta$ is an obtuse angle obtained by adding 90° to an actual contact angle $\theta_0$ which is formed when a droplet of the lubricant 4 is placed on a horizontal plane. Using these symbols, the height H of the deposit of the lubricant 4 that can be retained in the gap 10 is given by equation (1) below:

$$H = (2\gamma \cdot \cos \theta)/(\rho \cdot g \cdot h) \qquad (1)$$

where g is gravitational acceleration. It is to be noted that the absolute value of the right side of the equation is regarded as the height H of the lubricant deposit even when $\cos \theta$ takes a negative value depending on the value of $\theta$.

From equation (1) above, the clearance h of the constricted part 14 is expressed by $(2\gamma \cdot \cos \theta)/(\rho \cdot g \cdot H)$. Although it is recognized from equation (1) above that the clearance h should be decreased to increase the height H of the lubricant deposit in the gap 10, a reduction in the clearance h of the constricted part 14 would result in deterioration in ease of assembly as well as a cost increase.

Figure 9B:
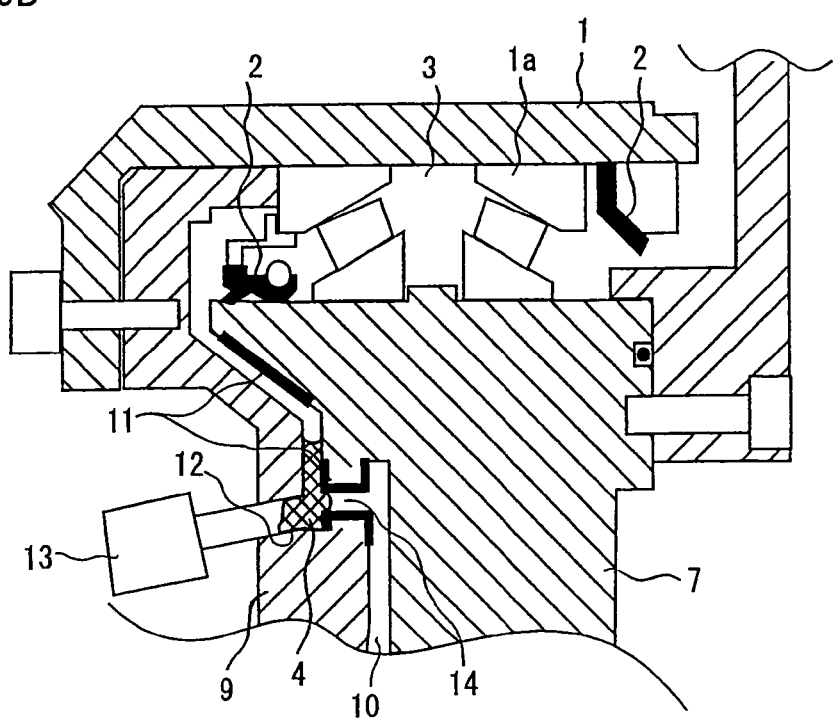

To overcome this problem, there may be formed, in one variation of the third embodiment, additional oil stop portions 11 on the circumferential surfaces of the constricted part 14 and their adjoining surface areas as shown in FIG. 9B. With the provision of these oil stop portions 11, which are formed of an oil-repellent coating on the surfaces of steel plates (the rotary member 7 and the supporting member 9), it becomes possible to increase the aforementioned contact angle $\theta_0$ between the outer surface of the lubricant 4 and the steel plate surfaces four times or more compared to a case where the steel plate surfaces are not covered with the oil-repellent coating. Accordingly, it is possible to markedly increase the height H of the lubricant deposit retainable in the gap 10 by forming the oil stop portions (oil-repellent surface areas) 11 on the circumferential surfaces of the constricted part 14 and their adjoining surface areas due to an increase in the contact angle $\theta$ without reducing the clearance h of the constricted part 14.

In a case where the amount of lubricant leakage over the left-hand oil seal 2 is expected to be not so large, the clearance h of the constricted part 14 may be increased. This will make it possible to achieve enhanced ease of assembly (or an increased range of permissible deviation from specified component locations). This consequently makes it possible to provide a rotational machine featuring high reliability and low cost.

While the oil stop portions (oil-repellent surface areas) 11 are formed not only on the circumferential surfaces of the constricted part 14 and their adjoining surface areas but also on another area in the aforementioned structure of FIG. 9B, the oil stop portions (oil-repellent surface areas) 11 may be formed only on the circumferential surfaces of the constricted part 14 and their adjoining surface areas if the amount of lubricant leakage is expected to be not so large.

In addition, the provision of the aforementioned additional oil stop portions (oil-repellent surface areas) 11 at the constricted part 14 serves to impede the passage of the leaked lubricant 4 through the constricted part 14 when the rotary member 7 is displaced from the supporting member 9 in an axial direction at their assembly causing misalignment of axial end surfaces of the constricted part 14. When the rotary member 7 and the supporting member 9 are misaligned from each other as illustrated in FIG. 10A, for example, the leaked lubricant 4 is blocked at a downstream end of the constricted part 14 and kept from flowing further down through the gap 10.

Figure 10A:
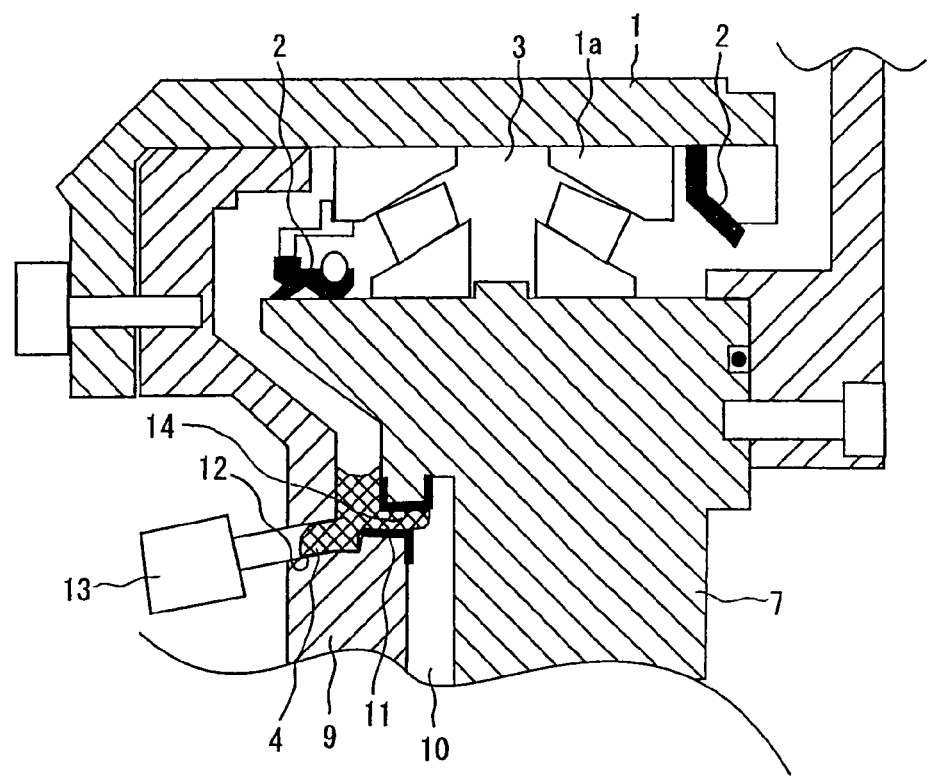
FIGS. 10A and 10B are enlarged fragmentary sectional diagrams showing other variations of the rotational machine of the third embodiment.
Figure 10B:
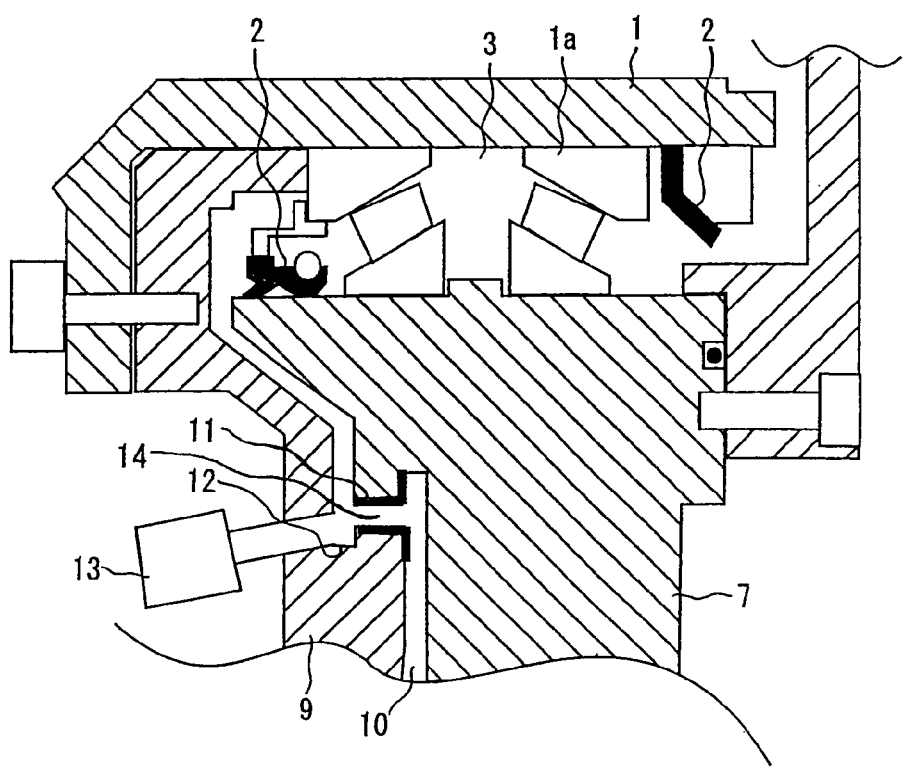

Although the aforementioned oil stop portions (oil-repellent surface areas) 11 may be formed on the entire surface areas of the constricted part 14 and its upstream and downstream end surface areas as illustrated in FIG. 10A, it is preferable to form the oil stop portions (oil-repellent surface areas) 11 only on the circumferential surfaces of the constricted part 14 and its downstream end surface area, and not on its upstream end surface area, as shown in FIG. 10B. This is because it becomes difficult for the leaked lubricant 4 to enter the lubricant 4 due to a large difference in surface tension at a boundary between the oil-repellent and non-oil-repellent surface areas if the oil stop portion 11 is formed on the upstream end surface area of the constricted part 14.

Even when the lubricant 4 leaks over the left-hand oil seal 2 into the gap 10 in large quantities, the leaked lubricant 4 is blocked at the constricted part 14 and prevented from flowing onto the contact surface area 8 with which the brake shoe (not shown) of the brake 23 comes into contact due to the provision of the oil stop portions (oil-repellent surface areas) 11 on the circumferential surfaces of the constricted part 14 and their adjoining surface areas as described above. This makes it possible to provide a rotational machine featuring high reliability capable of maintaining the normal braking force.

If dust or dirt enters the constricted part 14, the lubricant 4 may flow along the dust or dirt by capillary action. When the oil stop portions (oil-repellent surface areas) 11 are formed on the circumferential surfaces of the constricted part 14 and their adjoining surface areas as stated above, the leaked lubricant 4 does not spread along the dust or dirt but is blocked, forming spherical masses, because the oil stop portions 11 produce an oil-repelling effect which is greater than the effect of lubricant spreading along the dust or dirt due to capillary forces. Overall, the leaked lubricant 4 does not spread onto the contact surface area 8 of the rotary member 7 with which the brake shoe (not shown) of the brake 23 comes into contact, so that the third embodiment makes it possible to provide a rotational machine featuring high reliability capable of maintaining the normal braking force.

Fourth Embodiment

Figure 11:
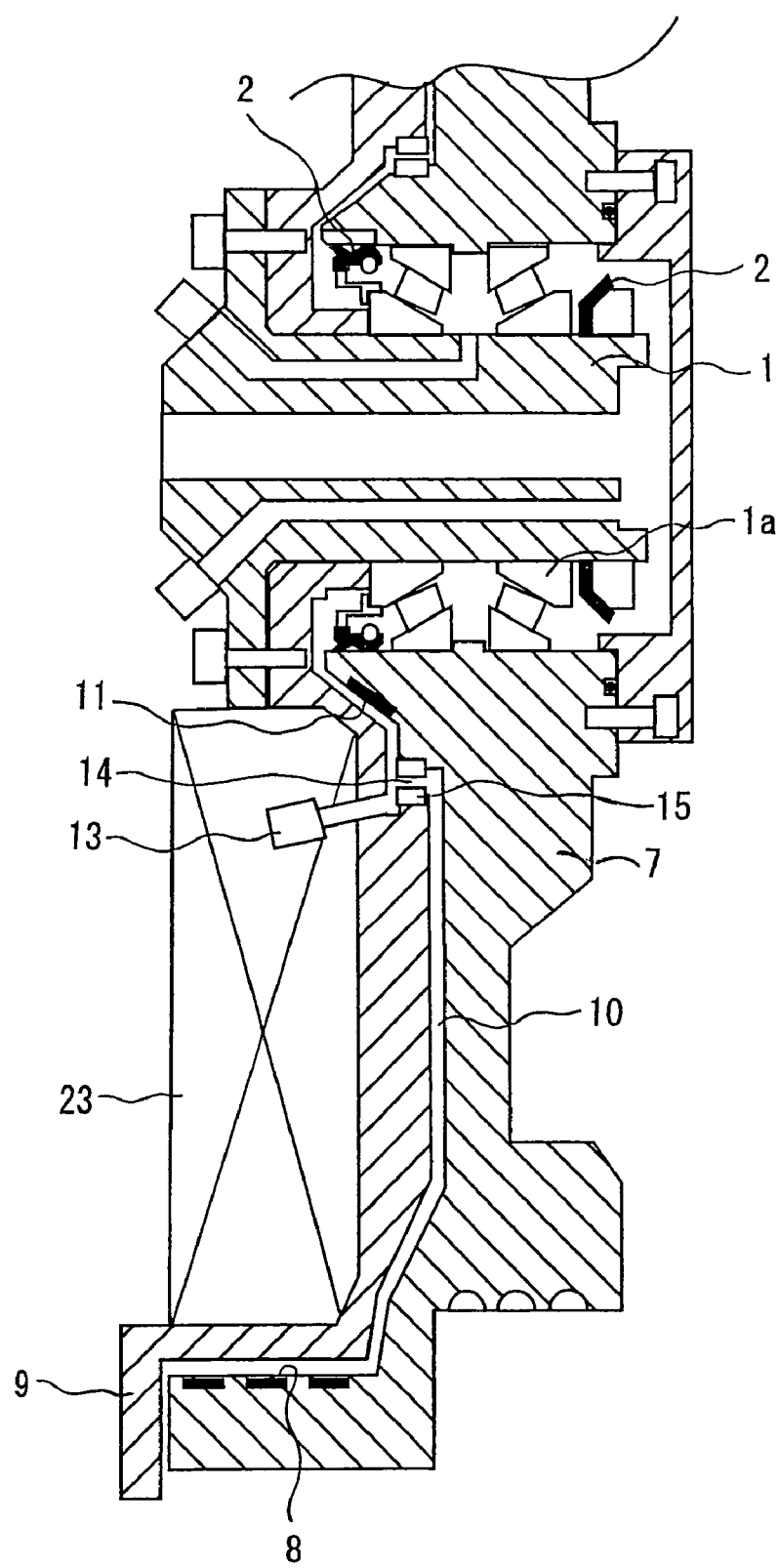
FIG. 11 is a fragmentary sectional diagram showing a rotational machine according to a fourth embodiment of the invention.
Figure 12A:
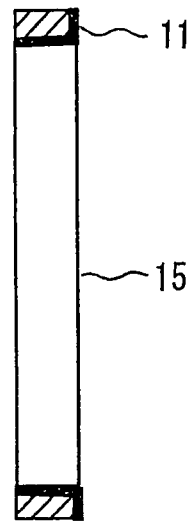
FIGS. 12A and 12B are sectional diagrams showing a ring-shaped member and the rotational machine of the fourth embodiment fitted with a pair of ring-shaped members, respectively.
Figure 12B:
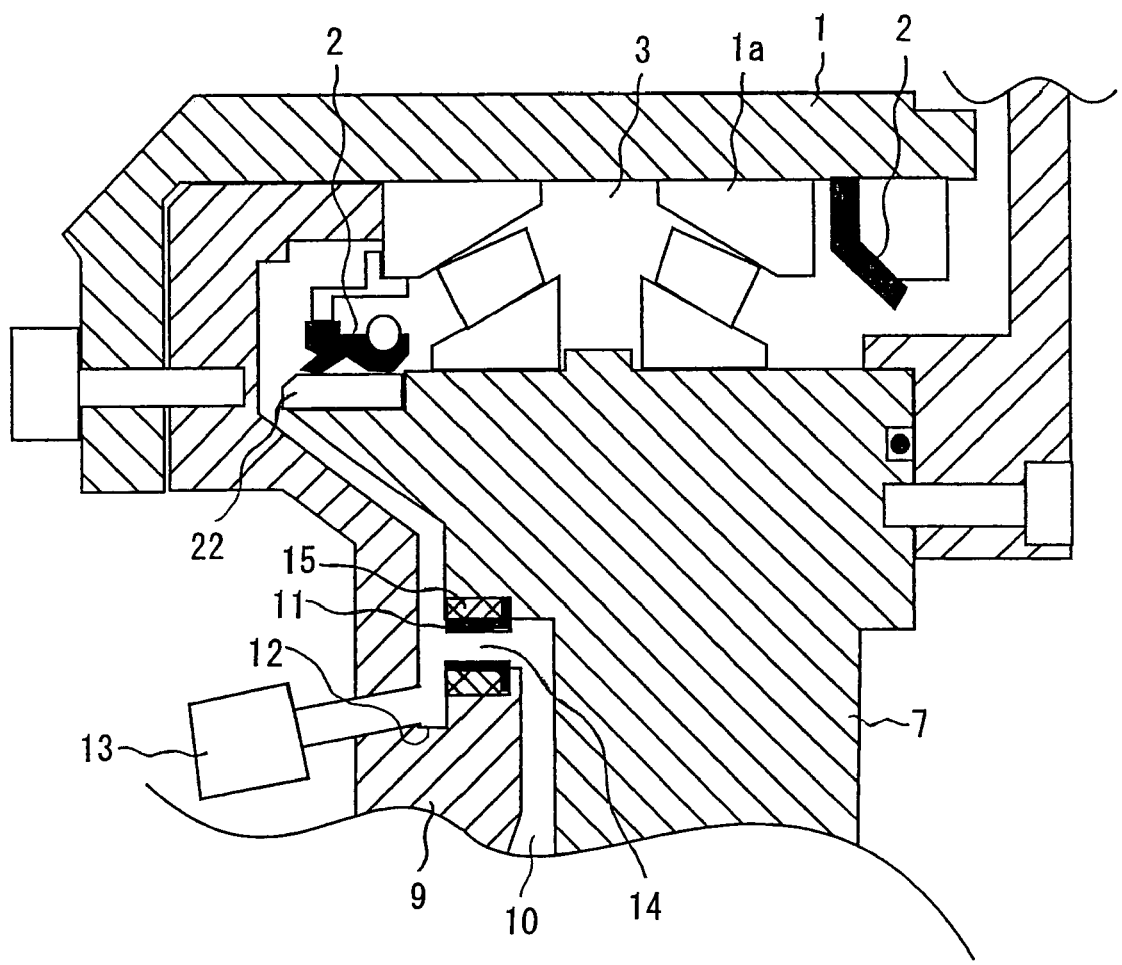

FIGS. 11, 12A and 12B are sectional diagrams showing a rotational machine according to a fourth embodiment of the invention, in which elements identical or similar to those of the foregoing embodiments are designated by the same reference numerals.

While there is formed the constricted part 14 between the facing surfaces of the rotary member 7 and the supporting member 9 in the second and third embodiments described above, the rotary member 7 and the supporting member 9 are made of cast-metal parts in certain cases and surface roughness of these cast-metal parts may cause a reduction in lubricant-blocking effect of the constricted part 14.

In the rotational machine of the fourth embodiment, ring-shaped members 15 are fitted one each on the rotary member 7 and in the supporting member 9, forming a constricted part 14 between outer and inner circumferential surfaces of the two ring-shaped members 15 as shown in FIG. 11.

The ring-shaped members 15 are produced as discrete elements and assembled into the rotational machine. The ring-shaped members 15 have minimal surface roughness as they are machined with a high degree of precision. This structure makes it possible to achieve high sealing performance and reduce overall machining and assembly costs.

To further improve the sealing performance, or lubricant-entrapping performance, of the constricted part 14, oil stop portions (oil-repellent surface areas) 11 may be formed on the ring-shaped members 15 as shown in FIGS. 12A and 12B in a manner similar to the third embodiment. When the two ring-shaped members 15 are fitted on the rotary member 7 and in the supporting member 9 as illustrated in FIG. 12B, the oil stop portions (oil-repellent surface areas) 11 formed on the ring-shaped members 15 provide enhanced lubricant-entrapping performance due to an increase in the contact angle θ between the outer surface of the lubricant 4 and each circumferential surface of the constricted part 14. Consequently, the lubricant 4 is blocked at the constricted part 14 and prevented from flowing onto the contact surface area 8 with which the brake shoe (not shown) of the brake 23 comes into contact even when the lubricant 4 has leaked into the gap 10 in large quantities. Accordingly, the fourth embodiment also makes it possible to provide a rotational machine featuring high reliability capable of maintaining the normal braking force.

While the oil stop portions (oil-repellent surface areas) 11 are formed only on the facing surfaces of the constricted part 14 (ring-shaped members 15) and its (their) downstream end surface area, and not on its (their) upstream end surface area, as illustrated in FIG. 12B, the oil stop portions (oil-repellent surface areas) 11 may be formed on entire outer surface areas of the constricted part 14 (ring-shaped members 15) and its (their) upstream and downstream end surface areas.

To form an oil-repellent surface area with strong adhesion to base metal, it might be necessary to plate each area where the oil-repellent surface area should be formed. Normally, this plating process results in an increase in processing and assembly costs. In the present embodiment employing the ring-shaped members 15, however, strong adhesion of the oil-repellent surface areas 11 to the base metal can be achieved by plating the ring-shaped members 15 alone, if necessary, at low manufacturing cost.

In one varied form of the embodiment, the ring-shaped members 15 may be formed of an oil-repellent material, such as PTFE, to eliminate the need for a process of forming the oil-repellent surface areas 11 on the ring-shaped members 15.

If the rotary member 7 is a cast-metal part, a machined contact surface region of the rotary member 7 where the oil seal 2 rests would have considerable surface roughness and consequent poor machining accuracy, and therefore operational life of the oil seal 2 fitted on this contact surface region of the rotary member 7 tends to be shortened, resulting in eventual leakage of the lubricant 4. In another varied form of the embodiment, a ring-shaped seating 22 formed as a discrete element having a finished surface is fitted on the contact surface region of the rotary member 7 as shown in FIG. 12B so that the left-hand oil seal 2 is held in smooth sliding contact with the ring-shaped seating 22. This arrangement helps prolong the useful life of the left-hand oil seal 2.

Fifth Embodiment

Figure 13:
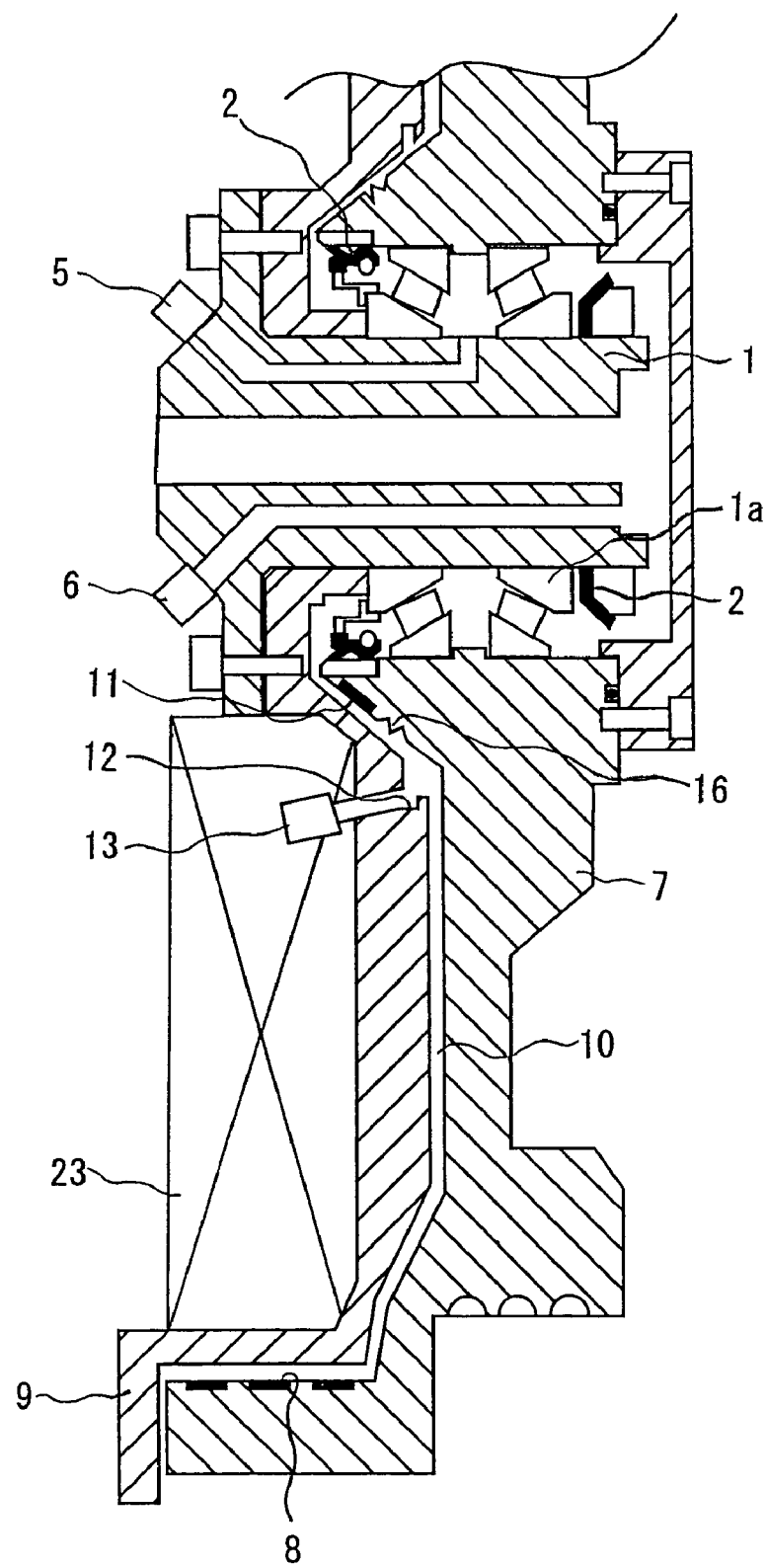
FIG. 13 is a fragmentary sectional diagram showing a rotational machine according to a fifth embodiment of the invention.
Figure 14:
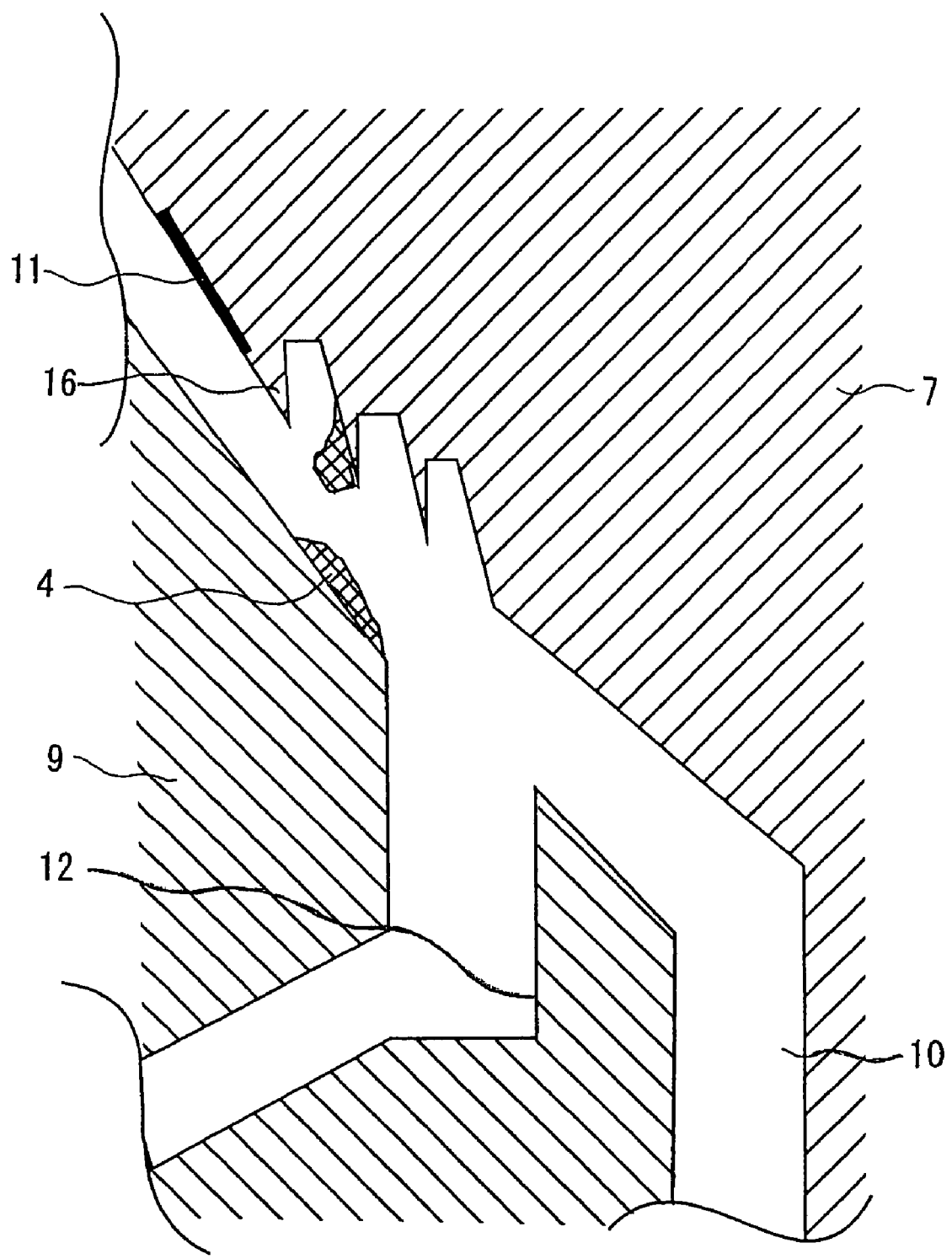
FIG. 14 is an enlarged fragmentary sectional diagram showing the rotational machine of FIG. 13.

FIGS. 13 and 14 are sectional diagrams showing a rotational machine according to a fifth embodiment of the invention, in which elements identical or similar to those of the foregoing embodiments are designated by the same reference numerals.

Depending on surrounding environment and operating conditions of the rotational machine, the viscosity or the lubricant 4 may decrease so much due to a temperature increase that the lubricant 4 can easily leak. If the rotational machine is operated at high ambient temperatures, for instance, the lubricant 4 is likely to leak in large quantities. According to the fifth embodiment, there is formed a furrowed part 16 in the surface of the rotary member 7 facing the gap 10 between the rotary member 7 and the supporting member 9 as shown in FIG. 13. This furrowed part 16 is made up of grooves and ridges and works as an oil stop portion.

The furrowed part 16 is sawtooth-shaped in cross section as shown in FIG. 14, for example. With this structure of the furrowed part 16, the lubricant 4 which has leaked over the left-hand oil seal 2 accumulates at the ridges of the furrowed part 16 and falls in droplets onto the surface of the supporting member 9. The lubricant 4 which has dropped onto the supporting member 9 is discharged to the exterior through the groove 12 and the lubricant outlet 13.

In this embodiment, the lubricant 4 is blocked at the furrowed part 16 situated in the gap 10 and prevented from flowing onto the contact surface area 8 of the rotary member 7 even when the lubricant 4 leaks into the gap 10 as a result of a reduction in its viscosity due to a temperature increase of the rotational machine. Accordingly, the fifth embodiment also makes it possible to provide a rotational machine featuring high reliability capable of maintaining the normal braking force.

Sixth Embodiment

Figure 15A:
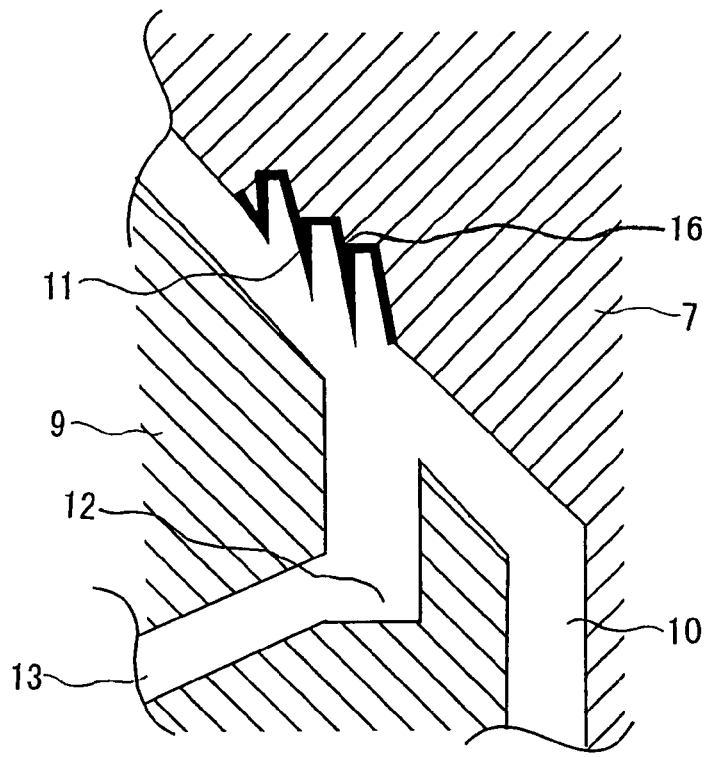
FIGS. 15A and 15B are enlarged fragmentary sectional diagrams showing a rotational machine according to a sixth embodiment of the invention and a variation thereof, respectively.
Figure 15B:
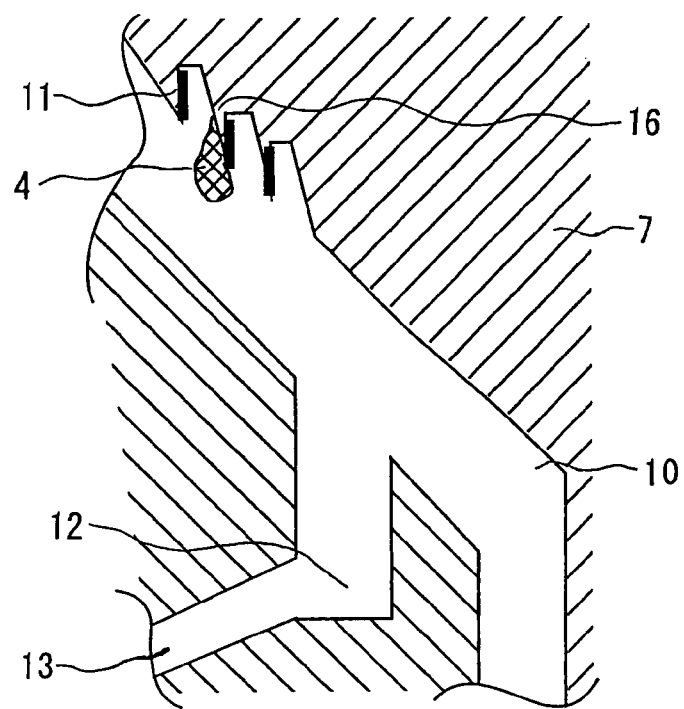

FIGS. 15A and 15B are enlarged fragmentary sectional diagrams showing a rotational machine according to a sixth embodiment of the invention and a variation thereof, respectively, in which elements identical or similar to those of the foregoing embodiments are designated by the same reference numerals.

Referring to FIGS. 15A and 15B, there is formed a sawtooth-shaped furrowed part 16 in the surface of the rotary member 7 facing the gap 10 between the rotary member 7 and the supporting member 9 in this embodiment. In one form of the embodiment, a contiguous oil stop portion (oil-repellent surface area) 11 is formed to cover entire surface areas of grooves and ridges of the sawtooth-shaped furrowed part 16 as shown in FIG. 15A. The oil stop portion (oil-repellent surface area) 11 thus formed serves to enhance a lubricant-cutting effect of the furrowed part 16.

While the oil stop portion 11 covers the entire surface areas of the furrowed part 16 in the aforementioned structure of FIG. 15A, separate oil stop portions (oil-repellent surface areas) 11 may be formed to cover only downstream faces of the ridges of the sawtooth-shaped furrowed part 16 as shown in FIG. 15B in an alternative form of the embodiment. This structure of the alternative form of the embodiment creates a larger difference in surface tension at boundaries between the oil-repellent and non-oil-repellent surface areas of the furrowed part 16. This serves to further enhance the lubricant-cutting effect of the furrowed part 16, compared to the structure of FIG. 15A.

Seventh Embodiment

Figure 16:
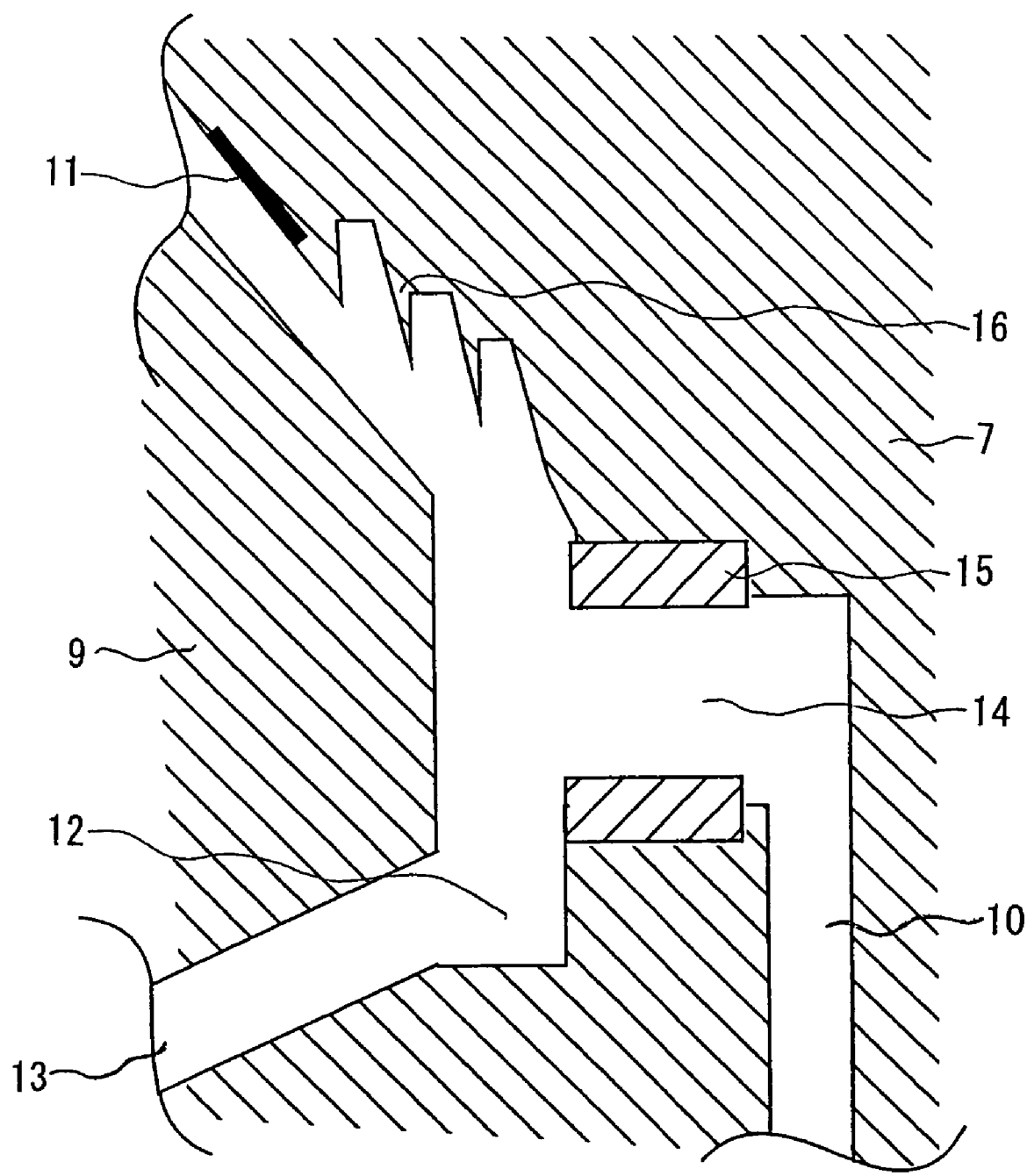
FIG. 16 is an enlarged fragmentary sectional diagram showing a rotational machine according to a seventh embodiment of the invention.

FIG. 16 is an enlarged fragmentary sectional diagram showing a rotational machine according to a seventh embodiment of the invention, in which elements identical or similar to those of the foregoing embodiments are designated by the same reference numerals.

The rotational machine of this embodiment is provided with a combination of a constricted part 14 like the one shown in FIG. 11 and a furrowed part 16 like the one shown in FIG. 14, both formed in the gap 10 between the rotary member 7 and the supporting member 9 as illustrated in FIG. 16.

Combined with the constricted part 14 of the fourth embodiment, the furrowed part 16 effectively cuts a flow of the lubricant 4 along the gap 10 when the lubricant 4 leaks in large quantities. When the lubricant 4 obstructed by the furrowed part 16 accumulates in the groove 12 in the supporting member 9, the lubricant 4 is blocked by the constricted part 14 lined with the oil-repelling ring-shaped members 15 and discharged to the exterior through the lubricant outlet 13. Thus, the aforementioned structure of the seventh embodiment also serves to prevent the leaked lubricant 4 from flowing onto the contact surface area 8 of the rotary member 7.

Eighth Embodiment

Figure 17:
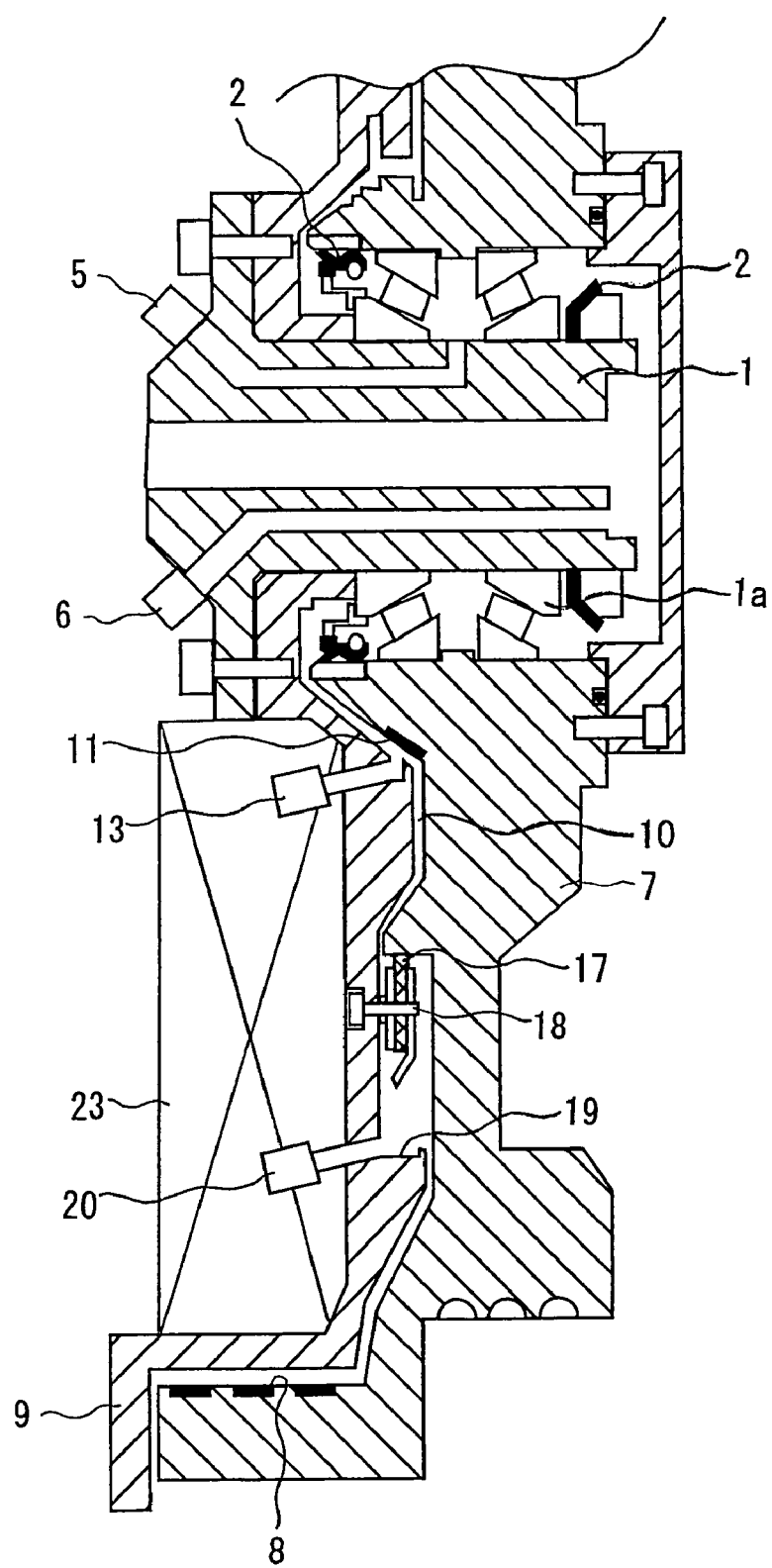
FIG. 17 is a fragmentary sectional diagram showing a rotational machine according to an eighth embodiment of the invention.

FIG. 17 is a fragmentary sectional diagram showing a rotational machine according to an eighth embodiment of the invention, in which elements identical or similar to those of the foregoing embodiments are designated by the same reference numerals.

If the lubricant 4 filled in the internal space 3 of the bearing 1a is grease, for example, a base oil component may be separated from the lubricant 4 and vaporize when the rotational machine has been used for an extended period of time. Should this situation occur, a mist, or fine droplets, of vaporized base oil might pass through the gap 10 between the rotary member 7 and the supporting member 9 and eventually adhere to the contact surface area 8 of the rotary member 7, causing a substantial loss of the braking force of the brake 23.

In the eighth embodiment of the invention, there is provided an oil-absorbing member 17 made of a porous material halfway in the gap 10 as shown in FIG. 17. Fixed to the supporting member 9 by a metal bracket 18 to allow easy replacement, the oil-absorbing member 17 is situated in such a manner that it is held in contact with the rotary member 7 as illustrated. The metal bracket 18 has a ring-shaped portion which is positioned concentrically about the shaft 1. The oil-absorbing member 17 and this ring-shaped portion together work to impede the passage of the mist of the lubricant 4 onto the contact surface area 8 of the rotary member 7.

If the lubricant 4 leaks over the left-hand oil seal 2 in large quantities, the mist of the lubricant 4 may permeate through the oil-absorbing member 17 and flow further downstream. To prevent this situation, there are formed a groove 19 and a lubricant outlet 20 filled with or lined with a porous material in the supporting member 9 so that the lubricant 4 which has permeated through the oil-absorbing member 17 is discharged to the exterior through the groove 19 and the lubricant outlet 20.

Some examples of the porous material that can be used for the oil-absorbing member 17 are such materials as sintered metal, ceramics and porous plastics, and such fibrous material as felt.

With the provision of the oil-absorbing member 17, it is possible to prevent the mist of the lubricant 4 from adhering to the contact surface area 8 of the rotary member 7 in this embodiment. Accordingly, the eighth embodiment also makes it possible to provide a rotational machine featuring high reliability capable of maintaining the normal braking force.

In addition, because the oil-absorbing member 17 is situated in contact with the rotary member 7, it is possible to prevent the passage of dust and dirt through the gap 10 down to the contact surface area 8 of the rotary member 7.

Furthermore, the provision of the groove 19 and the lubricant outlet 20 serves to discharge the leaked lubricant 4 to the exterior without allowing it to flow onto the contact surface area 8 of the rotary member 7 even when the lubricant 4 leaks in large quantities and its mist permeates through the oil-absorbing member 17 and flows further downstream.

Ninth Embodiment

Figure 18:
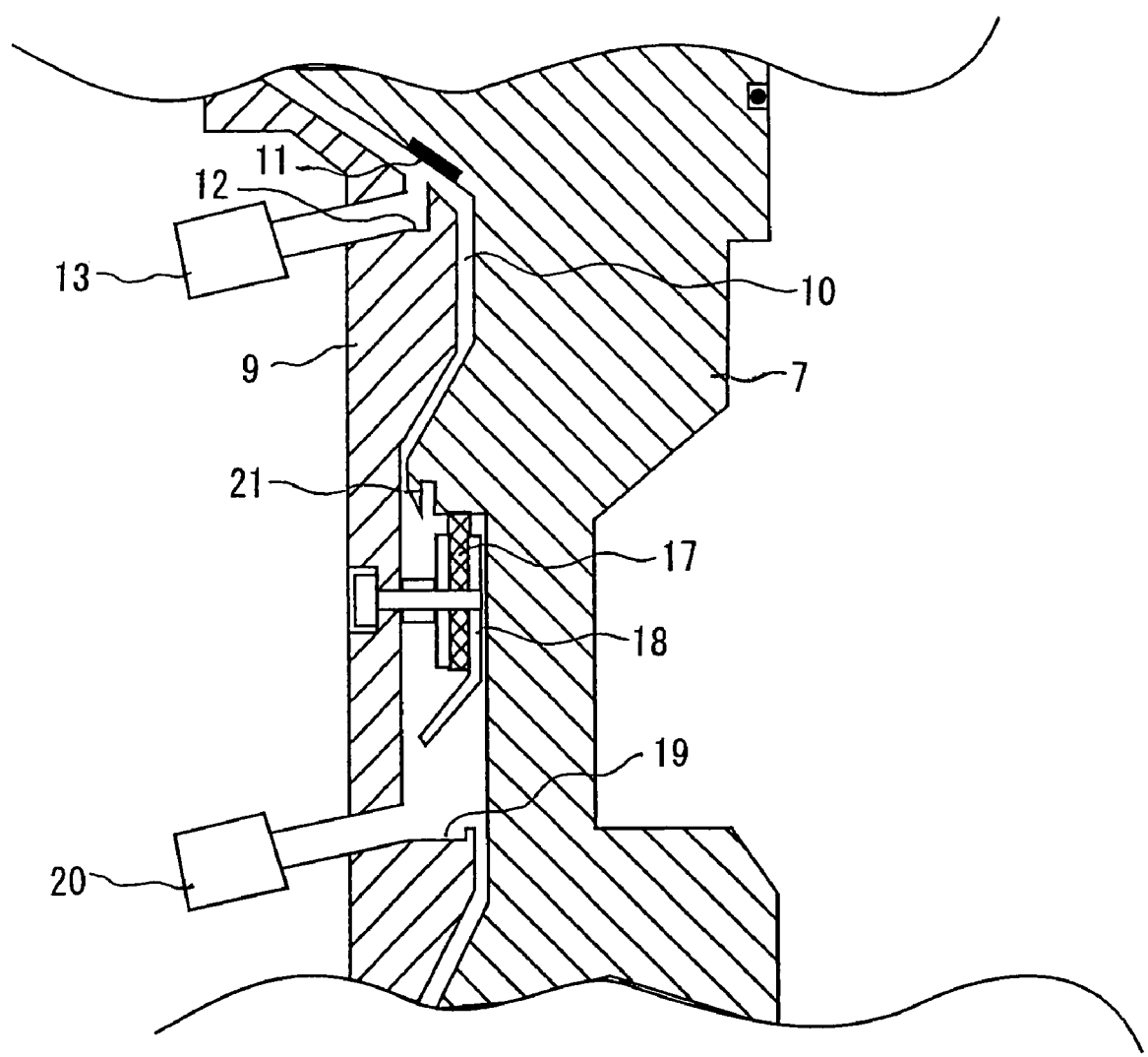
FIG. 18 is an enlarged fragmentary sectional diagram showing a rotational machine according to a ninth embodiment of the invention.
Figure 19A:
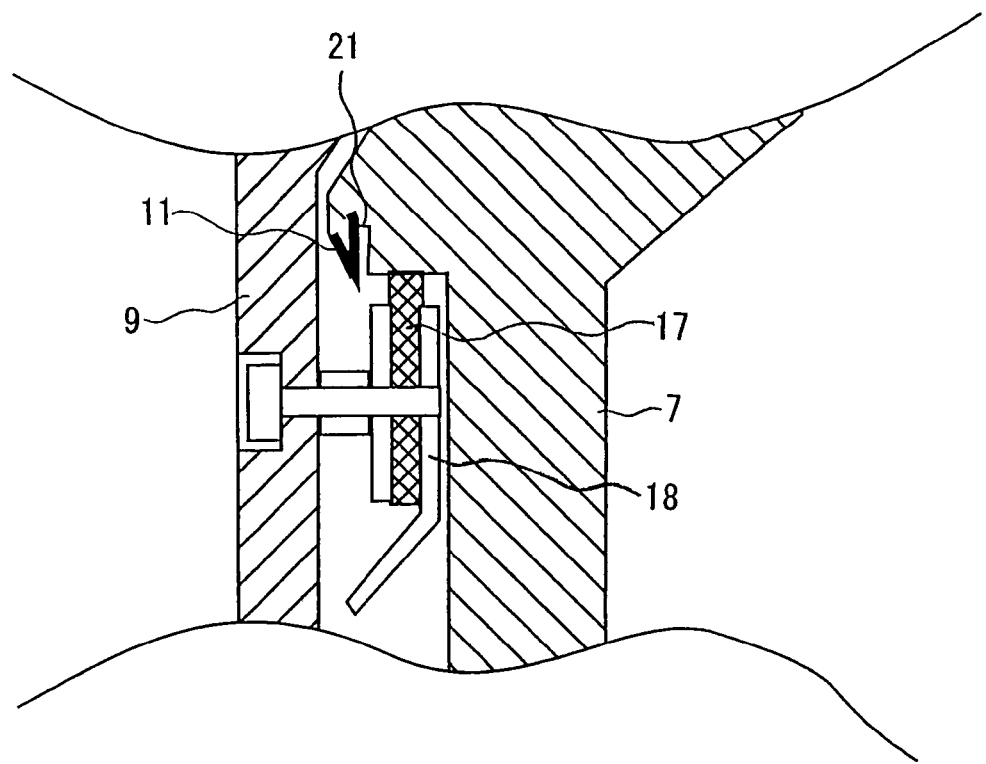
FIGS. 19A and 19B are enlarged fragmentary sectional diagrams showing variations of the rotational machine of the ninth embodiment.
Figure 19B:
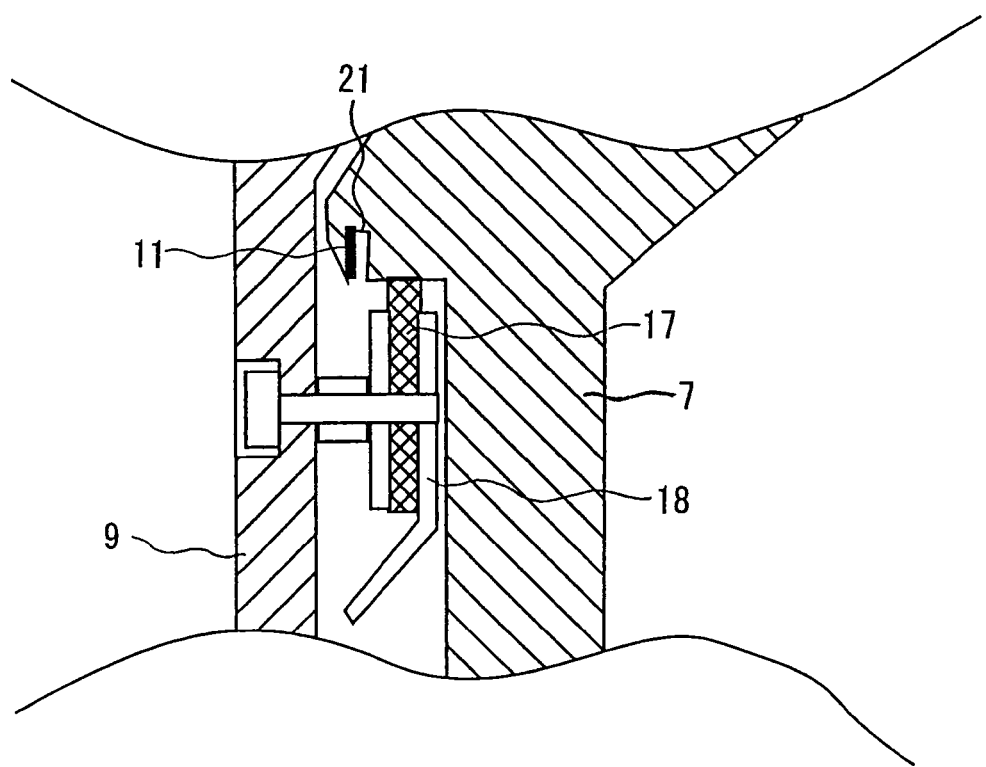

FIGS. 18, 19A and 19B are enlarged fragmentary sectional diagrams showing a rotational machine according to a ninth embodiment of the invention and variations thereof, in which elements identical or similar to those of the foregoing embodiments are designated by the same reference numerals.

When a mist, or fine droplets, of the lubricant 4 is formed, it may adhere to the surface of the rotary member 7 or the supporting member 9 and flow along the surface in the form of fluid.

In this embodiment, there is formed a furrowed part 21 made of a porous material in the proximity of a region where the rotary member 7 comes into contact with the oil-absorbing member 17 as shown in FIGS. 18, 19A and 19B. This furrowed part 21 serves to reduce the amount of the lubricant 4 permeating in liquid form through the oil-absorbing member 17.

When blocked by the furrowed part 21, the mist of the lubricant 4 turns into liquid form, gathering into a mass of the lubricant 4. The lubricant 4 that has accumulated at the furrowed part 21 falls along the surface of the supporting member 9 in the form of larger droplets and flows through a narrow gap in the metal bracket 18 of the oil-absorbing member 17 into the groove 19. Alternatively, the falling droplets of the lubricant 4 may permeate into the oil-absorbing member 17 through the narrow gap in the metal bracket 18 and flow into the groove 19. Then, flowing down through the groove 19, the lubricant 4 is eventually discharged to the exterior through the lubricant outlet 20.

In addition, there may be formed an oil-repellent surface area constituting an oil stop portion 11 covering entire surface areas on both sides of the furrowed part 21 as shown in FIG. 19A or covering a single surface area on one side of the furrowed part 21 only as shown in FIG. 19B. The provision of this oil stop portion 11 serves to block the mist of the leaked lubricant 4 more effectively.

What is claimed is:

1. A rotational machine comprising:
    a shaft having a central axis;
    a rotary member mounted on the shaft in such a manner that the rotary member can rotate about the central axis of the shaft with a bearing fitted between the shaft and the rotary member;
    an oil seal for sealing the bearing to prevent leakage of lubricant from inside the bearing through an axial end thereof onto a surface of the rotary member;
    a brake which comes into sliding contact with a contact surface area formed on part of the surface of the rotary member for arresting rotation of the rotary member;
    a supporting member fixedly mounted on the shaft, face to face with the rotary member forming a gap between the rotary member and the supporting member, the gap serving as a fluid path through which the lubricant which has leaked over the oil seal is allowed to flow; and
    an oil stopper formed at a location in the gap between the oil seal and the contact surface area for impeding flow of the leaked lubricant.

2. The rotational machine according to claim 1, wherein the oil stopper includes an oil-repellent surface area capable of repelling the lubricant formed on at least one of the rotary member and the supporting member.

3. The rotational machine according to claim 1, wherein the oil stopper includes a constricted part formed in the gap between the rotary member and the supporting member, the constricted part having a narrower clearance than the other part of the gap.

4. The rotational machine according to claim 3, wherein the clearance of the constricted part is made smaller than a value given by $(2\gamma \cdot \cos \theta)/(\rho \cdot g \cdot H)$, where H is the height of a deposit of the lubricant leaked over the oil seal and accumulated in the gap between the rotary member and the supporting member, $\gamma$ is the amount of surface tension of the lubricant, $\theta$ is the contact angle between an outer surface of the lubricant and a surface of the constricted part, $\rho$ is the density of the lubricant, and g is gravitational acceleration.

5. The rotational machine according to claim 3, wherein an oil-repellent surface area capable of repelling the lubricant is formed on a surface of the constricted part.

6. The rotational machine according to claim 5, wherein the oil-repellent surface area covers a circumferential surface of the constricted part and at least part of a downstream end surface of the constricted part without covering any part of an upstream end surface of the constricted part.

7. The rotational machine according to claim 3, wherein the clearance of the constricted part is unchanged along its length.

8. The rotational machine according to claim 3, wherein the constricted part is tapered so that the clearance of the constricted part varies along its length.

9. The rotational machine according to claim 3, wherein the constricted part is formed by a surface of a ring-shaped member fitted on the rotary member and a surface of another ring-shaped member fitted in the supporting member.

10. The rotational machine according to claim 9, wherein an oil-repellent surface area capable of repelling the lubricant is formed on the surface of at least one of the ring-shaped members.

11. The rotational machine according to claim 1, wherein the oil stopper includes a furrowed part formed in the gap between the rotary member and the supporting member.

12. The rotational machine according to claim 11, wherein the furrowed part is formed in the rotary member.

13. The rotational machine according to claim 11, wherein an oil-repellent surface area capable of repelling the lubricant is formed on the furrowed part.

14. The rotational machine according to claim 1, wherein the oil stopper includes an oil-absorbing member made of a porous material placed in the gap between the rotary member and the supporting member.

15. The rotational machine according to claim 14, wherein a furrowed part made of a porous material is formed in a region of the surface of the rotary member in the proximity of the oil-absorbing member.

16. The rotational machine according to claim 15, wherein an oil-repellent surface area is formed on the furrowed part.

17. The rotational machine according to claim 15, wherein the oil-absorbing member is held in contact with the rotary member without any substantial gap therebetween.

18. The rotational machine according to claim 1, wherein the oil stopper includes a combination of a groove for accumulating the leaked lubricant and a lubricant outlet through which the accumulated lubricant is discharged to an exterior of the rotational machine.

19. The rotational machine according to claim 1 further comprising a ring formed as a discrete element having a finished surface, the ring being fitted in a surface region of the rotary member where the oil seal is held in contact with the rotary member.

* * * * *